US012174286B2

(12) United States Patent
Trainin et al.

(10) Patent No.: US 12,174,286 B2
(45) Date of Patent: Dec. 24, 2024

(54) SYSTEM FOR MULTISTATIC RADAR COMMUNICATION

(71) Applicant: QUALCOMM Incorporated, San Diego, CA (US)

(72) Inventors: Solomon Trainin, Haifa (IL); Alecsander Petru Eitan, Haifa (IL); Assaf Kasher, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 17/694,893

(22) Filed: Mar. 15, 2022

(65) Prior Publication Data

US 2022/0206131 A1   Jun. 30, 2022

Related U.S. Application Data

(63) Continuation of application No. 17/020,410, filed on Sep. 14, 2020, now Pat. No. 11,280,893.

(Continued)

(51) Int. Cl.
G01S 13/00 (2006.01)
G01S 7/282 (2006.01)
(Continued)

(52) U.S. Cl.
CPC ............ G01S 13/003 (2013.01); G01S 7/282 (2013.01); G01S 7/292 (2013.01); G01S 13/505 (2013.01)

(58) Field of Classification Search
CPC ........ G01S 13/003; G01S 7/282; G01S 7/292; G01S 13/505; G01S 13/10; G01S 13/42;
(Continued)

(56) References Cited

U.S. PATENT DOCUMENTS 5,327,145 A   7/1994   Jelinek
5,623,267 A   4/1997   Wurman
(Continued)

FOREIGN PATENT DOCUMENTS

CN   105849582 B   1/2018
CN   110462432 A   11/2019
(Continued)

OTHER PUBLICATIONS

Bae J., et al., "Target Recognition with High-Fidelity Target Signatures and Adaptive Waveforms in MIMO Radar", 2015 IEEE 6th International Workshop on Computational Advances in Multi-Sensor Adaptive Processing (CAMSAP), IEEE, Dec. 13, 2015 (Dec. 13, 2015), pp. 285-288, XP032852564, DOI: 10.1109/CAMSAP. 2015.7383792 [retrieved on Jan. 14, 2016] abstract paragraph [I. Introduction.

(Continued)

Primary Examiner — Olumide Ajibade Akonai
Assistant Examiner — Yonghong Li
(74) Attorney, Agent, or Firm — Holland & Hart LLP/Qualcomm

(57) ABSTRACT

This disclosure provides systems, methods and apparatus, including computer programs encoded on computer storage media, for multistatic radar communications. In one aspect, a wireless communication device may determine a distance and direction of one or more receiving devices. The wireless communication device may transmit, to the one or more receiving devices, timing information indicating a timing relationship between a codeword sequence and one or more pulses. The wireless communication device may transmit a respective codeword of the codeword sequence in the direction of each of the one or more receiving devices. The wireless communication device may further transmit the one or more pulses in a plurality of directions. The wireless (Continued)

communication device may receive feedback from at least one of the one or more receiving devices and determine ranging information about an object based on the feedback and the distance or direction of at least one receiving device.

30 Claims, 16 Drawing Sheets

Related U.S. Application Data

(60) Provisional application No. 63/023,080, filed on May 11, 2020.

(51) Int. Cl.
*G01S 7/292* (2006.01)
*G01S 13/50* (2006.01)

(58) Field of Classification Search
CPC .......... G01S 13/582; G01S 7/006; G01S 5/00; H04W 64/00; H04W 4/00
See application file for complete search history.

(56) References Cited

U.S. PATENT DOCUMENTS

| | | | |
|---|---|---|---|
| 7,515,092 B2* | 4/2009 | Zumsteg | G01S 13/003 342/21 |
| 8,600,297 B2 | 12/2013 | Ketchum et al. | |
| 8,743,863 B2* | 6/2014 | Vermani | H04L 5/0007 370/209 |
| 9,918,195 B2 | 3/2018 | Malik et al. | |
| 10,139,484 B2 | 11/2018 | Yoon et al. | |
| 10,795,009 B2* | 10/2020 | Lien | G01S 13/42 |
| 10,897,285 B2 | 1/2021 | Vermani et al. | |
| 2008/0056308 A1* | 3/2008 | Zumsteg | H04J 3/0682 370/503 |
| 2017/0031013 A1 | 2/2017 | Halbert et al. | |
| 2018/0199377 A1* | 7/2018 | Sanderovich | G01S 7/023 |
| 2018/0331730 A1 | 11/2018 | Sanderovich et al. | |
| 2019/0159149 A1 | 5/2019 | Ryu et al. | |
| 2019/0170869 A1 | 6/2019 | Kravets et al. | |
| 2019/0293748 A1 | 9/2019 | Gulati et al. | |
| 2020/0003867 A1 | 1/2020 | Arbabian et al. | |
| 2020/0018842 A1 | 1/2020 | Karls et al. | |
| 2020/0119780 A1 | 4/2020 | Klemmer | |
| 2020/0191943 A1 | 6/2020 | Wu et al. | |
| 2021/0349199 A1 | 11/2021 | Trainin et al. | |

FOREIGN PATENT DOCUMENTS

| | | |
|---|---|---|
| CN | 110770595 A | 2/2020 |
| EP | 3012658 B1 | 8/2017 |
| JP | 2016524704 A | 8/2016 |
| JP | 2019174284 A | 10/2019 |
| WO | WO-2010021904 A1 | 2/2010 |
| WO | WO-2011014213 | 2/2011 |
| WO | WO-2017083379 | 5/2017 |
| WO | WO-2018151888 | 8/2018 |
| WO | WO-2019012361 A1 | 1/2019 |

OTHER PUBLICATIONS

International Search Report and Written Opinion—PCT/US2021/025520—ISA/EPO—Jun. 30, 2021.
Merlano-Duncan J.C., et al., "Architectures and Synchronization Techniques for Coherent Distributed Remote Sensing Systems", IGARSS 2019—2019 IEEE International Geoscience and Remote Sensing Symposium, IEEE, Jul. 28, 2019 (Jul. 28, 2019), pp. 8875-8878, XP033655803, DOI: 10.1109/IGARSS.2019.8898444, [retrieved on Nov. 13, 2019] paragraph [I. Introduction] abstract.
Taiwan Search Report—TW110112298—TIPO—Aug. 29, 2024.

* cited by examiner

SYSTEM FOR MULTISTATIC RADAR COMMUNICATION

CROSS-REFERENCE TO RELATED APPLICATIONS

This patent application is a continuation of and claims priority to U.S. patent application Ser. No. 17/020,410, entitled "SYSTEM FOR MULTISTATIC RADAR COMMUNICATION" and filed on Sep. 14, 2020, which is assigned to the assignee hereof and claims priority to U.S. Provisional Patent Application No. 63/023,080 entitled "SYSTEM FOR MULTISTATIC RADAR COMMUNICATION" and filed on May 11, 2020, which is assigned to the assignee hereof. The disclosures of all prior applications are considered part of and are incorporated by reference in this patent application.

TECHNICAL FIELD

This disclosure relates generally to wireless communication, and more specifically, to multistatic radar measurements in wireless communication systems.

DESCRIPTION OF THE RELATED TECHNOLOGY

Radar is a ranging technique that can be used to determine the distances of objects relative to a given location. A radar system operates by transmitting and receiving electromagnetic pulses. Some of the pulses reflect off objects or surfaces along the transmission path, producing "echoes." The radar system may determine the distances of the objects or surfaces based on a round trip time between the transmission of a pulse to the reception of an echo of that pulse. In a monostatic radar system, the antennas used to transmit the pulses ("transmit antennas") are collocated with the antennas used to receive the echoes ("receive antennas"). For example, the transmit antennas and receive antennas are often disposed on the same device. This allows for simple synchronization between the timing of the transmitted pulses and the timing of the received echoes since the same device (or system) clock may be used for both.

In a multistatic radar system, the transmit antennas are located a substantial distance away from the receive antennas. The spatial diversity afforded by multistatic radar systems provides a high accuracy of target location and allows different aspects of a target to be viewed simultaneously. However, to achieve the necessary amount of separation between the transmit antennas and receive antennas, many multistatic radar systems are implemented using multiple devices with no wired communication between them. For example, the transmit antennas may be disposed on a transmit device and the receive antennas may be disposed on one or more spatially diverse receive devices (with a shared or partially shared coverage area). The transmit device may transmit pulses in various directions and the receive devices may detect the resulting echoes. The transmit and receive devices use separate clocks for the timing of pulse transmissions and echo detection. Accordingly, a mechanism is needed to synchronize the transmission of pulses by the transmit device with the reception of echoes by receive devices and to exchange radar measurement information between the transmit and receive devices.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method can be performed by a wireless communication device to transmit radar pulses to one or more receiving devices. In some implementations, the method can include obtaining a distance and direction of one or more receiving devices; transmitting, to the one or more receiving devices, timing information indicating a timing relationship between a codeword sequence and one or more pulses; transmitting a respective codeword of the codeword sequence, using beamforming, in the direction of each of the one or more receiving devices; transmitting the one or more pulses, using beamforming, in a plurality of directions, where the one or more pulses are transmitted in a first radar frame; receiving feedback from at least one of the one or more receiving devices based at least in part on the one or more pulses transmitted in the first radar frame, where the feedback represents a relationship between a first pulse of the one or more pulses and an echo of the first pulse detected by the at least one receiving device; and determining ranging information about an object along a path of the first pulse based at least in part on the received feedback and the distance or direction of at least one receiving device, where the echo represents a reflection of the first pulse by the object. The ranging information can include at least one of a distance, direction, or velocity of the object in relation to the wireless communication device.

In some implementations, the method may further include transmitting, to the one or more receiving devices, one or more radar alert frames preceding the codeword sequence, each of the radar alert frames being transmitted in the direction of a respective one of the receiving devices and indicating an address of the respective receiving device and an address to which the feedback is to be sent. In some implementations, transmitting the one or more pulses may include dynamically changing an antenna configuration of the wireless communication device to transmit the one or more pulses in the plurality of directions, where each antenna configuration is associated with a respective one of the plurality of directions.

In some implementations, the feedback may indicate a respective pulse of the one or more pulses for which an echo is detected by the at least one receiving device. In some other implementations, the feedback may indicate at least one of an azimuth or an elevation of an angle of arrival (AOA) of the echo in relation to the at least one receiving device. In some other implementations, the feedback may indicate a delay between the transmission of the first pulse and the detection of the echo by the at least one receiving device. In some other implementations, the feedback may further indicate a channel impulse response (CIR) associated with the echo and a delay between the transmission of the first pulse and the measuring of the CIR by the at least one receiving device.

In some implementations, the feedback may indicate a distance or Doppler shift measured by the at least one receiving device in relation to the object. In some other implementations, determining the ranging information may include retransmitting the one or more pulses, using beamforming, in the plurality of directions, where the one or more pulses are retransmitted in a second radar frame; receiving additional feedback from the at least one receiving device based at least in part on the one or more pulses retransmitted in the second radar frame; and determining a velocity of the object based at least in part on the feedback associated with the first radar frame and the additional feedback associated with the second radar frame.

Another innovative aspect of the subject matter described in this disclosure can be implemented in a wireless communication device. The wireless communication device can include a plurality of antennas, one or more processors, and a memory. The memory stores instructions that, when executed by the one or more processors, can cause the wireless communication device to obtain a distance and direction of one or more receiving devices; transmit, to the one or more receiving devices, timing information indicating a timing relationship between a codeword sequence and one or more pulses; transmit a respective codeword of the codeword sequence, using beamforming, in the direction of each of the one or more receiving devices; transmit the one or more pulses, using beamforming, in a plurality of directions, where the one or more pulses are transmitted in a first radar frame; receive feedback from at least one of the one or more receiving devices based at least in part on the one or more pulses transmitted in the first radar frame, where the feedback represents a relationship between a first pulse of the one or more pulses and an echo of the first pulse detected by the at least one receiving device; and determine ranging information about an object along a path of the first pulse based at least in part on the received feedback and the determined distance or direction of the at least one receiving device, where the echo represents a reflection of the first pulse by the object.

Another innovative aspect of the subject matter described in this disclosure can be implemented as a method of wireless communication. The method can be performed by a wireless communication device to receive echoes of radar pulses transmitted by a transmitting device. In some implementations, the method can include receiving, from the transmitting device, timing information indicating a timing relationship between a codeword sequence and one or more pulses; detecting, at a first time, a first codeword of the codeword sequence in a first radar frame transmitted by the transmitting device; detecting, at a second time, an echo of a first pulse of the one or more pulses in the first radar frame transmitted by the transmitting device; generating feedback about an object along a path of the first pulse based at least in part on the first time, the second time, and the timing information, where the echo represents a reflection of the first pulse by the object; and transmitting the feedback to the transmitting device.

In some implementations, the method may further include determining a direction of the transmitting device; detecting a radar alert frame transmitted by the transmitting device prior to the codeword sequence, where the radar alert fame includes an indication of an address of the transmitting device and an address of the wireless communication device; and tuning a plurality of antennas of the wireless communication device in the direction of the transmitting device, responsive to detecting the radar alert frame, to detect the codeword sequence. In some implementations, the method may further include positioning a plurality of antennas of the wireless communication device in a plurality of directions to detect the echo of the first pulse. In some implementations, the one or more pulses may include a sequence of pulses and the timing information may indicate delay between the codeword sequence and the beginning of the sequence of pulses.

In some implementations, generating the feedback may include identifying a position of the first pulse in the sequence of pulses based on the first time, the second time, and the timing information, where the feedback includes an indication of the position of the first pulse. In some implementations, generating the feedback may include determining at least one of an azimuth or an elevation of an angle of arrival (AOA) of the echo, where the feedback includes an indication of the determined azimuth or elevation. In some implementations, generating the feedback may include determining a delay between the transmission of the first pulse and the detection of the echo based on the first time, the second time, and the timing information, where the feedback includes an indication of the determined delay. In some other implementations, generating the feedback may include measuring a channel impulse response (CIR) associated with the echo, where the feedback indicates the measured CIR and a delay between the transmission of the respective pulse and the measurement of the CIR.

In some implementations, generating the feedback may include determining a distance or Doppler shift associated with the object in relation to the wireless communication device based at least in part on the first echo, where the feedback includes the determined distance or Doppler shift. In some implementations, determining the Doppler shift associated with the object may include detecting, at a third time, an echo of a second pulse of one or more pulses in a second radar frame transmitted by the transmitting device; and determining the Doppler shift based on the first echo and the second echo.

Another innovative aspect of the subject matter described in this disclosure can be implemented in a wireless communication device. The wireless communication device can include a plurality of antennas, one or more processors, and a memory. The memory stores instructions that, when executed by the one or more processors, can cause the wireless communication device to receive, from the transmitting device, timing information indicating a timing relationship between a codeword sequence and one or more pulses; detect, at a first time, a first codeword of the codeword sequence in a first radar frame transmitted by the transmitting device; detect, at a second time, an echo of a first pulse of the one or more pulses in the first radar frame transmitted by the transmitting device; generate feedback about an object along a path of the first pulse based at least in part on the first time, the second time, and the timing information, where the echo represents a reflection of the first pulse by the object; and transmit the feedback to the transmitting.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
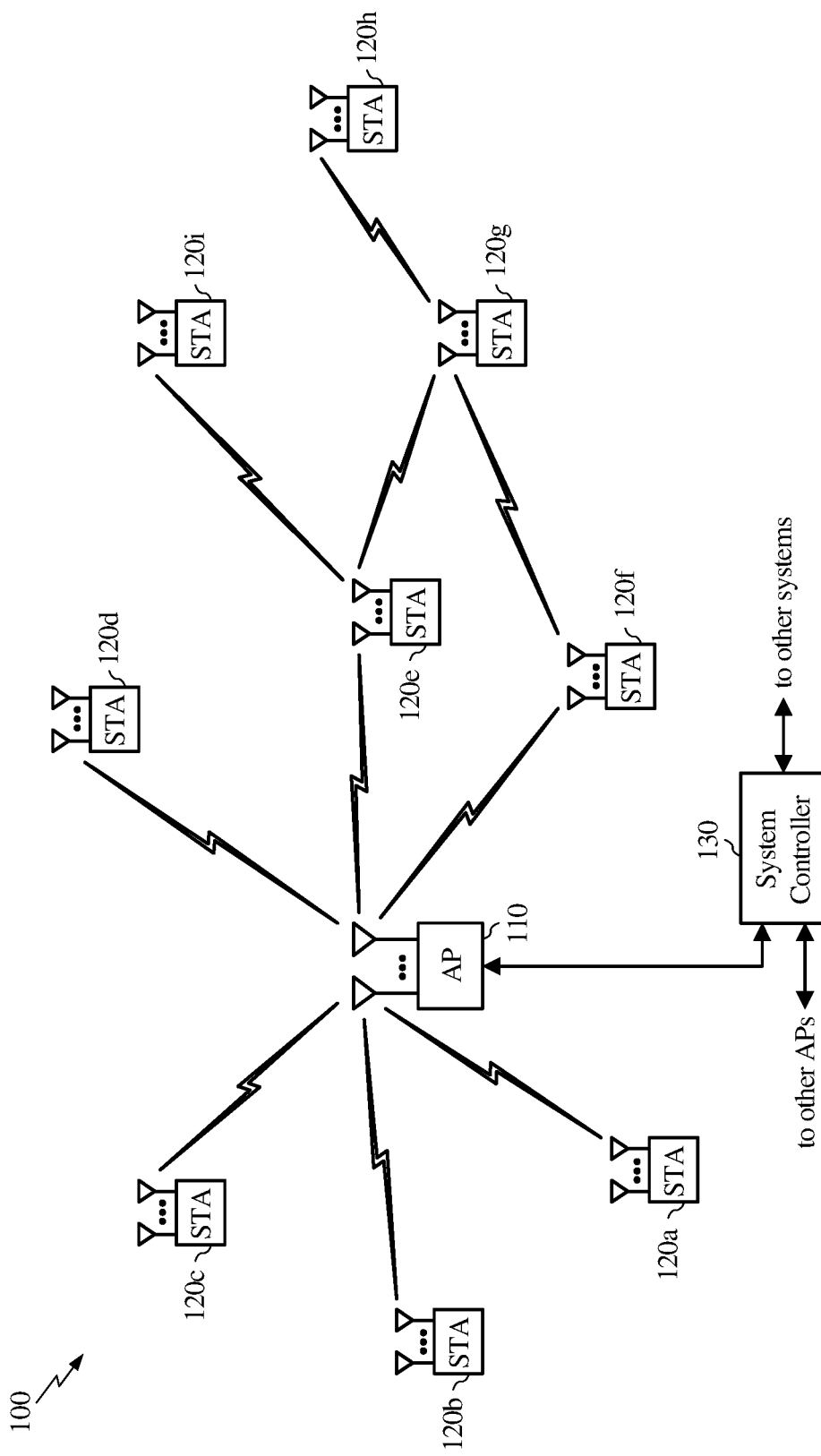
FIG. 1 shows a block diagram of an example wireless system.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IOT) network.

A WLAN may be formed by one or more access points (APs) that provide a shared wireless communication medium for use by a number of client devices also referred to as stations (STAs). The basic building block of a WLAN conforming to the IEEE 802.11 family of standards is a Basic Service Set (BSS), which is managed by an AP. Each BSS is identified by a Basic Service Set Identifier (BSSID) that is advertised by the AP. Wireless communication devices (such as APs and STAs) communicate by transmitting and receiving electromagnetic signals in the RF spectrum. Electromagnetic signals may be modulated to carry data or information between transmitting and receiving devices. In addition, beamforming may be used to focus the energy of each electromagnetic signal in a narrow direction to compensate for path loss and achieve greater range. The electromagnetic signals transmitted by a transmitting device may reflect off objects and surfaces along the transmission path before reaching a receiving device located a distance away. Accordingly, signaling techniques used in wireless communications (such as beamforming and packet formats conforming to the IEEE 802.11 family of standards) may be well-suited for multistatic radar.

Implementations of the subject matter described in this disclosure may be used for multistatic radar communications. In some implementations, multistatic radar communications may be performed over multiple phases. During a session setup phase, a transmitting device may determine a distance and direction of one or more receiving devices. In some implementations, the transmitting device also may transmit timing information to each of the receiving devices during the session setup phase. The timing information may indicate a timing relationship between a codeword sequence and one or more pulses of a radar frame. During a radar phase, the transmitting device may transmit one or more radar frames, including the codeword sequence and the one or more radar pulses. The codeword sequence (also known as a synchronization sequence) can be used, in conjunction with the timing information, to synchronize receive clocks of the receiving devices with a transmit clock of the transmitting device. The radar pulses may be transmitted, using beamforming, in a number of directions. As a result, one or more of the radar pulses may reflect off objects in the vicinity, resulting in echoes that can be detected by one or more of the receiving devices. As used herein, the term "radar pulse" may refer to any wireless signal that can be used to detect objects along its path of transmission based on radar techniques, whereas a "radar frame" is a grouping of radar pulses in accordance with wireless communication protocols defined by the IEEE 802.11 standard.

During a measurement delivery phase, each receiving device that detected an echo may generate feedback based on the detected echo. For example, a receiving device may detect an echo based on a channel impulse response (CIR) measurement. Upon detecting an echo, a receiving device may use the codeword sequence and timing information provided by the transmitting device to determine the exact time at which the pulse associated with the echo was transmitted by the transmitting device. The receiving device also may determine an azimuth or elevation associated with the detected echo. In some aspects, the receiving device may determine a relative distance of a target object that produced the echo. In some other aspects, the receiving device may determine a Doppler shift associated with the target object based on echoes detected from one or more radar frames. Each receiving device that detected an echo may further report its feedback to the transmitting device. The transmitting device may determine ranging information (such as a distance, direction, or velocity) about one or more objects based on the feedback reported by each of the receiving devices.

Particular implementations of the subject matter described in this disclosure can be implemented to realize one or more of the following potential advantages. By leveraging wireless communication techniques defined by the IEEE 802.11 family of standards, aspects of the present disclosure may enable multistatic radar to be implemented by existing wireless communication systems and networks.

For example, an AP (or STA) may perform the function of a radar transmitter and one or more STAs (or APs) may perform the functions of each radar receiver. In particular, the radar transmitter may use beamforming techniques to transmit highly directional radar pulses which may produce respective echoes when interacting with objects in the environment. The radar transmitter may use packet formats conforming to the IEEE 802.11 family of standards to communicate timing and synchronization information regarding the radar pulses to each radar receiver. Each radar receiver also may use such packet formats to provide feedback regarding the echoes to the radar transmitter. Further, multistatic radar implementations of the present disclosure obey the link access rules defined by existing IEEE 802.11 standards, thereby enabling radar functionality in frequency bands commonly used for wireless communications. Accordingly, aspects of the present disclosure may enable multistatic radar functionality to be implemented anywhere a WLAN is, or can be, deployed.

FIG. 1 shows a block diagram of an example wireless system 100. The wireless system 100 is shown to include a wireless access point (AP) 110 and a number of wireless stations (STAs) 120a-120i. For simplicity, one AP 110 is shown in FIG. 1. The AP 110 may form a wireless local area network (WLAN) that allows the AP 110, the STAs 120a-120i, and other wireless devices (not shown for simplicity) to communicate with each other over a wireless medium. The wireless medium, which may be divided into a number of channels or into a number of resource units (RUs), may facilitate wireless communications between the AP 110, the STAs 120a-120i, and other wireless devices connected to the WLAN. In some implementations, the STAs 120a-120i can communicate with each other using peer-to-peer communications (such as without the presence or involvement of the AP 110). The AP 110 may be assigned a unique MAC address that is programmed therein by, for example, the manufacturer of the access point. Similarly, each of the STAs 120a-120i also may be assigned a unique MAC address.

In some implementations, the wireless system 100 may correspond to a multiple-input multiple-output (MIMO) wireless network and may support single-user MIMO (SU-MIMO) and multi-user (MU-MIMO) communications. In some implementations, the wireless system 100 may support orthogonal frequency-division multiple access (OFDMA) communications. Further, although the WLAN is depicted in FIG. 1 as an infrastructure Basic Service Set (BSS), in some other implementations, the WLAN may be an Independent Basic Service Set (IBSS), an Extended Service Set (ESS), an ad-hoc network, or a peer-to-peer (P2P) network (such as operating according to one or more Wi-Fi Direct protocols).

The STAs 120a-120i may be any suitable Wi-Fi enabled wireless devices including, for example, cell phones, personal digital assistants (PDAs), tablet devices, laptop computers, or the like. The STAs 120a-120i also may be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The AP 110 may be any suitable device that allows one or more wireless devices (such as the STAs 120a-120i) to connect to another network (such as a local area network (LAN), wide area network (WAN), metropolitan area network (MAN), or the Internet). In some implementations, a system controller 130 may facilitate communications between the AP 110 and other networks or systems. In some implementations, the system controller 130 may facilitate communications between the AP 110 and one or more other APs (not shown for simplicity) that may be associated with other wireless networks. In addition, or in the alternative, the AP 110 may exchange signals and information with one or more other APs using wireless communications.

The AP 110 may periodically broadcast beacon frames to enable the STAs 120a-120i and other wireless devices within wireless range of the AP 110 to establish and maintain a communication link with the AP 110. The beacon frames, which may indicate downlink (DL) data transmissions to the STAs 120a-120i and solicit or schedule uplink (UL) data transmissions from the STAs 120a-120i, are typically broadcast according to a target beacon transmission time (TBTT) schedule. The broadcasted beacon frames may include a timing synchronization function (TSF) value of the AP 110. The STAs 120a-120i may synchronize their own local TSF values with the broadcasted TSF value, for example, so that all of the STAs 120a-120i are synchronized with each other and with the AP 110.

In some implementations, each of the stations STAs 120a-120i and the AP 110 may include one or more transceivers, one or more processing resources (such as processors or Application-Specific Integrated Circuits (ASICs)), one or more memory resources, and a power source (such as a battery). The one or more transceivers may include Wi-Fi transceivers, Bluetooth transceivers, cellular transceivers, or other suitable radio frequency (RF) transceivers (not shown for simplicity) to transmit and receive wireless communication signals. In some implementations, each transceiver may communicate with other wireless devices in distinct frequency bands or using distinct communication protocols. The memory resources may include a non-transitory computer-readable medium (such as one or more nonvolatile memory elements, such as EPROM, EEPROM, Flash memory, a hard drive, etc.) that stores instructions for performing one or more operations described with respect to FIGS. 5-11.

Figure 2:
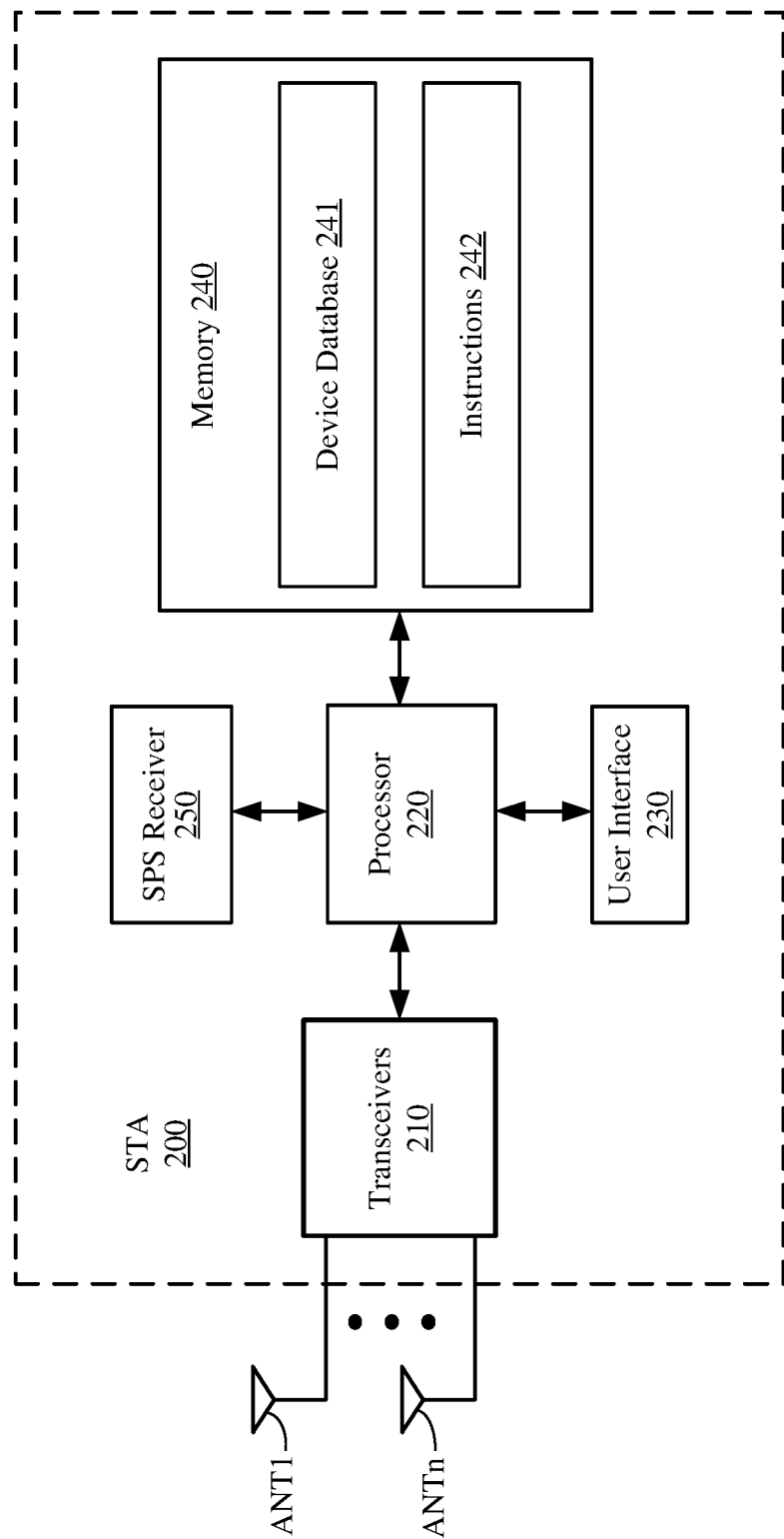
FIG. 2 shows a block diagram of an example wireless station (STA).

FIG. 2 shows an example wireless station (STA) 200. The STA 200 may be one implementation of at least one of the STAs 120a-120i of FIG. 1. The STA 200 may include one or more transceivers 210, a processor 220, a user interface 230, a memory 240, and a number of antennas ANT1-ANTn. The transceivers 210 may be coupled to antennas ANT1-ANTn, either directly or through an antenna selection circuit (not shown for simplicity). The transceivers 210 may be used to transmit signals to and receive signals from other wireless devices including, for example, a number of APs and a number of other STAs. Although not shown in FIG. 2 for simplicity, the transceivers 210 may include any number of transmit chains to process and transmit signals to other wireless devices via antennas ANT1-ANTn, and may include any number of receive chains to process signals received from antennas ANT1-ANTn. Thus, the STA 200 may be configured for MIMO communications and OFDMA communications. The MIMO communications may include SU-MIMO communications and MU-MIMO communications. In some implementations, the STA 200 may use multiple antennas ANT1-ANTn to provide antenna diversity. Antenna diversity may include polarization diversity, pattern diversity, and spatial diversity.

The processor 220 may be any suitable one or more processors capable of executing scripts or instructions of one or more software programs stored in the STA 200 (such as within the memory 240). In some implementations, the processor 220 may be or include one or more microprocessors providing the processor functionality and external memory providing at least a portion of machine-readable media. In other implementations, the processor 220 may be or include an Application Specific Integrated Circuit (ASIC) with the processor, the bus interface, the user interface, and at least a portion of the machine-readable media integrated into a single chip. In some other implementations, the processor 220 may be or include one or more Field Programmable Gate Arrays (FPGAs) or Programmable Logic Devices (PLDs).

The user interface 230, which is coupled to the processor 220, may be or represent a number of suitable user input devices such as, for example, a speaker, a microphone, a display device, a keyboard, a touch screen, and so on. In some implementations, the user interface 230 may allow a user to control a number of operations of the STA 200, to interact with one or more applications executable by the STA 200, and other suitable functions.

In some implementations, the STA 200 may include a satellite positioning system (SPS) receiver 250. The SPS receiver 250, which is coupled to the processor 220, may be used to acquire and receive signals transmitted from one or more satellites or satellite systems via an antenna (not shown for simplicity). Signals received by the SPS receiver 250 may be used to determine (or at least assist with the determination of) a location of the STA 200.

The memory 240 may include a device database 241 that may store location data, configuration information, data rates, a medium access control (MAC) address, timing information, modulation and coding schemes (MCSs), traffic indication (TID) queue sizes, ranging capabilities, and other suitable information about (or pertaining to) the STA 200. The device database 241 also may store profile information for a number of other wireless devices. The profile information for a given wireless device may include, for example, a service set identification (SSID) for the wireless device, a Basic Service Set Identifier (BSSID), operating channels, TSF values, beacon intervals, ranging schedules, channel state information (CSI), received signal strength indicator (RSSI) values, goodput values, and connection history with the STA 200. In some implementations, the profile information for a given wireless device also may include clock offset values, carrier frequency offset values, and ranging capabilities.

The memory 240 also may be or include a non-transitory computer-readable storage medium (such as one or more nonvolatile memory elements, such as EPROM, EEPROM, Flash memory, a hard drive, and so on) that may store computer-executable instructions 242 to perform all or a portion of one or more operations described in this disclosure.

Figure 3:
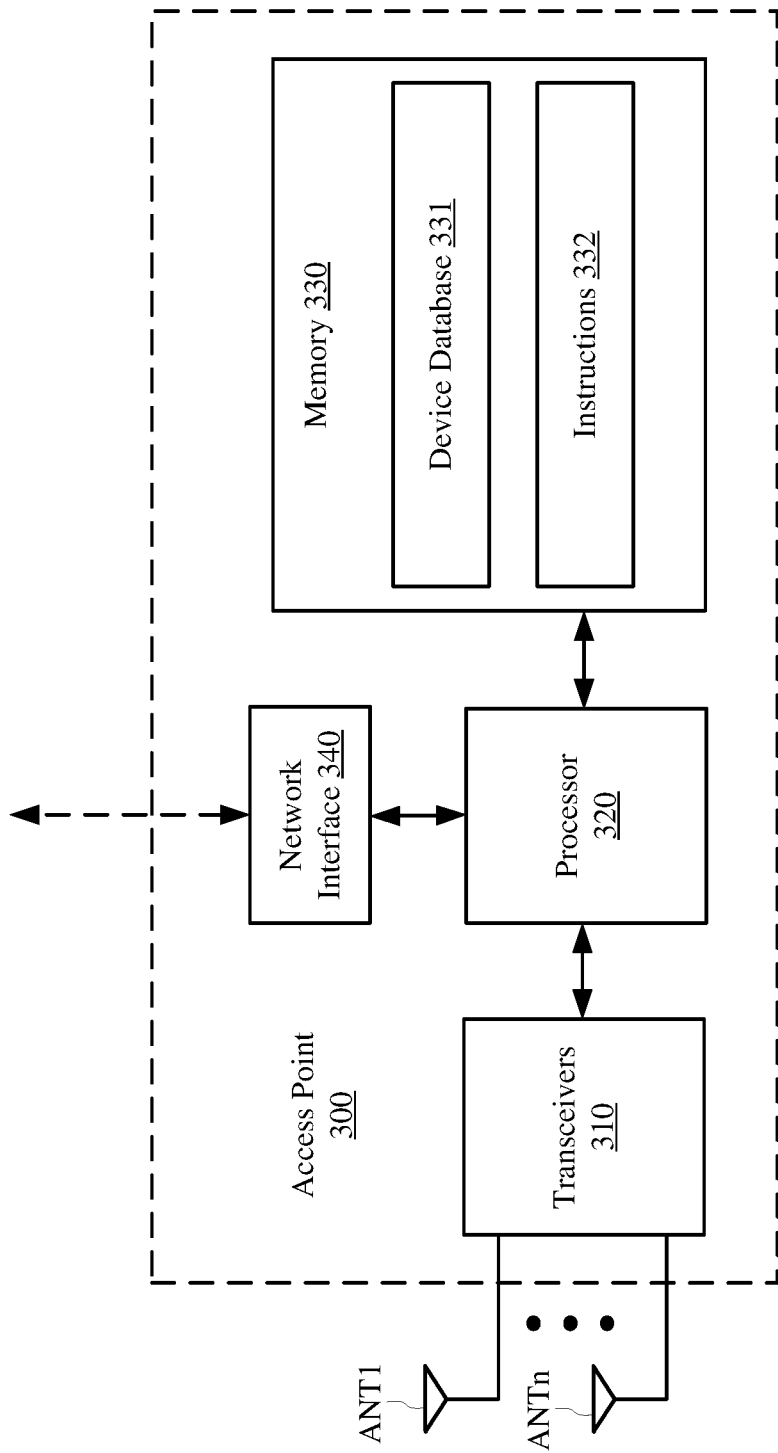
FIG. 3 shows a block diagram of an example access point (AP).

FIG. 3 shows an example access point (AP) 300. The AP 300 may be one implementation of the AP 110 of FIG. 1. The AP 300 may include one or more transceivers 310, a processor 320, a memory 330, a network interface 340, and a number of antennas ANT1-ANTn. The transceivers 310 may be coupled to the antennas ANT1-ANTn, either directly or through an antenna selection circuit (not shown for simplicity). The transceivers 310 may be used to transmit signals to and receive signals from other wireless devices including, for example, one or more of the STAs 120a-120i of FIG. 1 and other APs. Although not shown in FIG. 3 for simplicity, the transceivers 310 may include any number of transmit chains to process and transmit signals to other wireless devices via the antennas ANT1-ANTn, and may include any number of receive chains to process signals received from the antennas ANT1-ANTn. Thus, the AP 300 may be configured for MIMO communications and OFDMA communications. The MIMO communications may include SU-MIMO communications and MU-MIMO communications. In some implementations, the AP 300 may use multiple antennas ANT1-ANTn to provide antenna diversity. Antenna diversity may include polarization diversity, pattern diversity, and spatial diversity.

In high frequency (such as 60 GHz or millimeter wave (mmWave)) wireless communication systems (such as conforming to the IEEE 802.11ad or 802.11ay amendments of the IEEE 802.11 standard), communications may be beamformed using phased array antennas at the transmitter and the receiver. Beamforming generally refers to a wireless communication technique by which the transmitting device and the receiving device adjust transmit or receive antenna settings to achieve a desired link budget for subsequent communications. The procedure to adapt the transmit and receive antennas, referred to as beamforming training, may be performed initially to establish a link between the transmitting and receiving devices and also may be performed periodically to maintain a quality link using optimized transmit and receive beams.

The network interface 340, which is coupled to the processor 320, may be used to communicate with the system controller 130 of FIG. 1. The network interface 340 also may allow the AP 300 to communicate, either directly or via one or more intervening networks, with other wireless systems, with other APs, with one or more back-haul networks, or any combination thereof.

The memory 330 may include a device database 331 that may store location data, configuration information, data rates, the MAC address, timing information, MCSs, ranging capabilities, and other suitable information about (or pertaining to) the AP 300. The device database 331 also may store profile information for a number of other wireless devices (such as one or more of the stations 120a-120i of FIG. 1). The profile information for a given wireless device may include, for example, an SSID for the wireless device, a BSSID, operating channels, CSI, received signal strength indicator (RSSI) values, goodput values, and connection history with the AP 300. In some implementations, the profile information for a given wireless device also may include TID queue sizes, a preferred packet duration for trigger-based UL transmissions, and a maximum amount of queued UL data that the wireless device is able to insert into TB PPBUs.

The memory 330 also may be or include a non-transitory computer-readable storage medium (such as one or more nonvolatile memory elements, such as EPROM, EEPROM, Flash memory, a hard drive, and so on) that may store computer-executable instructions 332 to perform all or a portion of one or more operations described in this disclosure.

Figure 4:
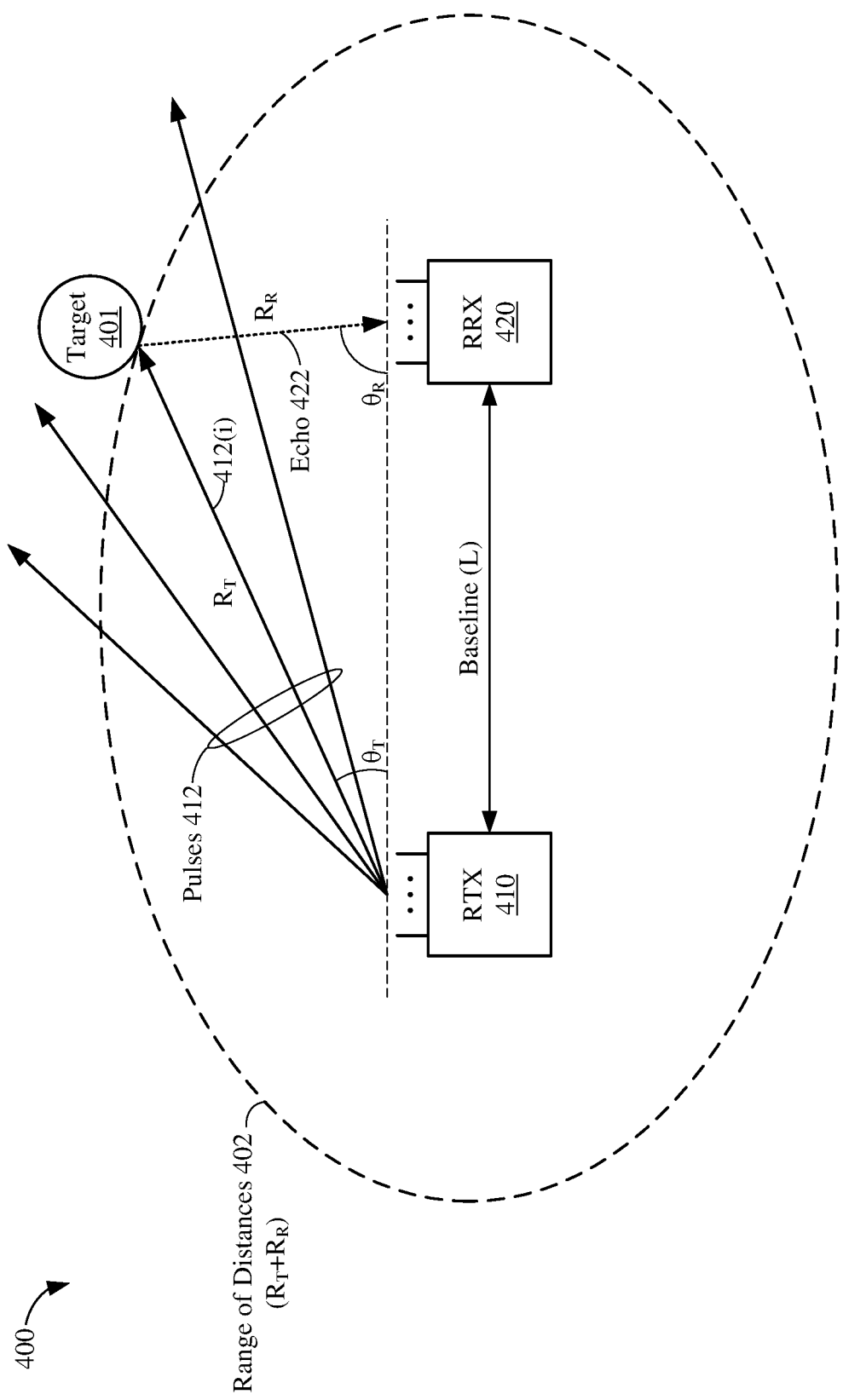
FIG. 4 shows an example bistatic radar system.

FIG. 4 shows an example bistatic radar system 400. The bistatic radar system 400 includes a radar transmitter (RTX) 410 and a radar receiver (RRX) 420. The radar transmitter 410 and the radar receiver 420 are spatially separated by a baseline (L). In some implementations, the radar transmitter 410 may be one example of the AP 110 of FIG. 1 or the AP 300 of FIG. 3 and the radar receiver 420 may be an example of one of the STAs 120a-120i of FIG. 1 or the STA 200 of FIG. 2.

The radar transmitter 410 is configured to transmit radar pulses 412 in a number of directions. Each of the pulses 412 may be a beamformed RF signal having a particular width and directionality. Objects or surfaces along the trajectory of any of the pulses 412 may cause the pulses 412 to reflect or scatter. Reflected pulses may be referred to as "echoes" of the pulses from which they originate. In the example of FIG. 4, a target object 401 is located along the path of one of the radar pulses 412. The radar pulse 412(*i*) incident on the target object 401 is reflected as an echo 422. As shown in FIG. 4, the echo 422 is reflected in the direction of the radar receiver 420. The radar receiver 420 may determine ranging information about the target object 401 based, at least in part, on the timing of the echo 422. Example ranging information may include, but is not limited to, a distance, direction, or velocity of the target object 401.

In some implementations, the radar receiver 420 may determine a distance ($R_R$) of the target object 401 relative to the radar receiver 420 based, at least in part, on the baseline distance L (between the radar transmitter 410 and the radar receiver 420), an angle of arrival ($\theta_R$) of the echo 422, and a time of flight ($\tau$) from the transmission of the incident pulse 412(*i*) by the radar transmitter 410 to the reception of the resulting echo 422 by the radar receiver 420. More specifically, the distance $R_R$ can be calculated according to Equation 1.

$$R_R = \frac{(R_T + R_R)^2 - L^2}{2(R_T + R_R - L\cos\theta_R)} \quad (1)$$

where $R_T + R_R$ represents the combined distances from the target object 401 to each of the radar transmitter 410 and the radar receiver 420. As shown in FIG. 4, $R_T + R_R$ defines a range of distances 402 around the radar transmitter 410 and the radar receiver 420 (in the shape of an ellipse) in which the target object 401 may be located. More specifically, $R_T + R_R$ can be calculated, according to Equation 2, as a function of the baseline (L), the time of flight of the reflected pulse ($\tau$), and the propagation speed of the radar pulses ($c_p$).

$$R_T + R_R = c_p \tau + L \quad (2)$$

With reference to Equations 1 and 2, the baseline L and propagation speed $c_p$ represent fixed or preconfigured values inherent to the radar system 400. The angle of arrival OR may be determined based on a time difference of arrival (TDOA) of the echo 422 between different receive antennas of the radar receiver 420 or based on the antenna sector (corresponding to a preset beam of a phased array antenna) used by the radar receiver 420 to receive the echo 422. However, to calculate the time of flight $\tau$, the radar receiver 420 must have knowledge of the time at which the incident pulse 412(*i*) was transmitted at the position of the receiver. More specifically, the time of flight $\tau$ can be calculated, according to Equation 3, as a function of the time of transmission of the incident pulse ($T_{pulse}$) and the time of reception of the echo ($T_{echo}$).

$$\tau = T_{echo} - T_{pulse} \quad (3)$$

Because the radar transmitter 410 and the radar receiver 420 are implemented in (or correspond to) separate wireless communication devices, the radar transmitter 410 may need to communicate the timing of the transmission of the incident pulse $T_{pulse}$ to the radar receiver 420. However, because the radar transmitter 410 transmits pulses 412 in a number of directions, the radar transmitter 410 may be unaware as to which of the pulses 412 is incident on the target object 401. Accordingly, the radar transmitter 410 may need to communicate the timing of each of the pulses 412 to the radar receiver 420, and the radar receiver 420 may need to determine which of the pulses 412 resulted in the echo 422. In some implementations, packet formats in accordance with IEEE 802.11 standards may be used to communicate such timing information ($T_{pulse}$) from the radar transmitter 410 to the radar receiver 420.

In some implementations, the radar transmitter 410 may transmit timing information followed by a synchronization sequence (not shown for simplicity) to the radar receiver 420 prior to transmitting the radar pulses 412. The timing information can be used to synchronize a receiver clock of the radar receiver 420 with a transmit clock of the radar transmitter 410. For example, the timing information may indicate a timing offset or delay between one or more portions of the synchronization sequence and the beginning of the transmission of the radar pulses 412. Thus, upon detecting at least a portion of the synchronization sequence and the subsequent echo 422, the radar receiver 420 may determine the exact time at which the incident pulse 412(*i*) was transmitted by the radar transmitter 410. The radar receiver 420 may compare the timing of the echo $T_{echo}$ with the timing of the transmitted pulse $T_{pulse}$ to determine the distance $R_R$ of the target object 401 (such as described with respect to Equations 1-3).

In some implementations, the radar transmitter 410 also may determine ranging information regarding the target object 401. For example, the radar transmitter 410 may determine its relative distance $R_T$ to the target object 401. For example, in some aspects, the radar receiver 420 may provide feedback regarding the echo 422 to the radar transmitter 410. The feedback may include the timing of the echo $T_{echo}$, the timing of the transmitted pulse $T_{pulse}$, the time of flight $\tau$, the angle of arrival $\theta_R$, the calculated distance $R_R$, or any combination thereof. The radar transmitter 410 may then calculate the distance $R_T$ of the target object 401 based, at least in part, on the angle of departure $\theta_T$ of the incident pulse 412(*i*). For example, the radar transmitter 410 may calculate the distance $R_T$ by substituting the angle of departure $\theta_T$ for the angle of arrival $\theta_R$ in Equation 1. The radar transmitter 410 may determine the angle of departure $\theta_T$ based on the antenna sector (corresponding to a particular beam of a phased array antenna) used by the radar transmitter 410 to transmit the incident pulse 412(*i*).

Figure 5:
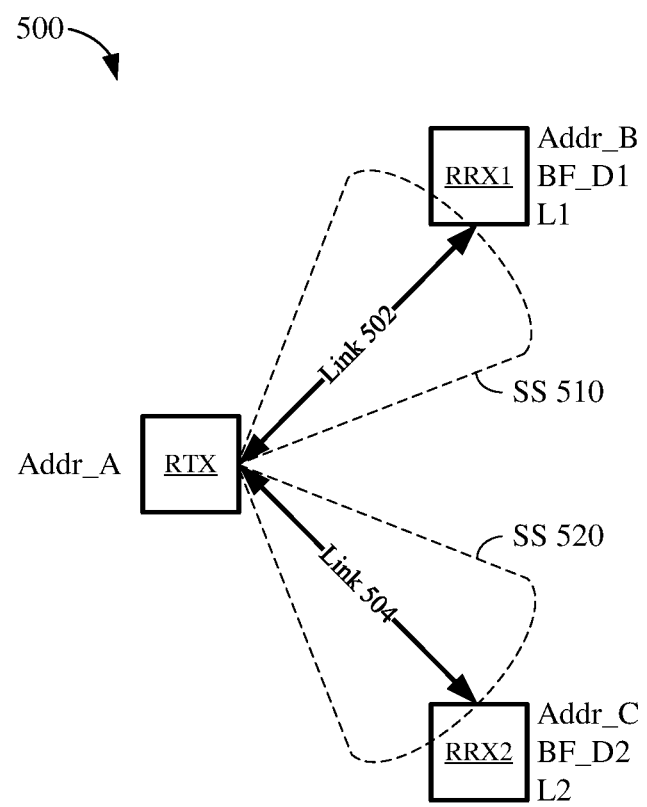
FIG. 5 shows an example multistatic radar system.

FIG. 5 shows an example multistatic radar system 500. The multistatic radar system 500 includes a radar transmitter RTX and multiple spatially diverse radar receivers RRX1 and RRX2. Although two radar receivers RRX1 and RRX2 are shown in the example of FIG. 5, the multistatic radar system 500 may include any number of radar receivers in actual implementations. The radar transmitter RTX is spatially separated from each of the radar receivers RRX1 and RRX2 by a respective baseline. In some implementations, the radar transmitter RTX may be an example of one of the APs 110 or 300 of FIGS. 1 and 3, respectively, or the radar transmitter 410 of FIG. 4. In some implementations, each of the radar receivers RRX1 and RRX2 may be an example of one of the STAs 120*a*-120*i* or 200 of FIGS. 1 and 2, respectively, or the radar receiver 420 of FIG. 4.

In the example of FIG. 5, the multistatic radar system 500 may be configured to perform a session setup phase of a multistatic radar operation. During the session setup phase, the radar transmitter RTX may establish beam links 502 and 504 with each of the radar receivers RRX1 and RRX2, respectively. The beam links 502 and 504 may be used for subsequent communications between the radar transmitter RTX and the radar receivers RRX1 and RRX2. In addition, the radar transmitter RTX may determine a distance (such as a baseline distance) to each of the radar receivers RRX1 and RRX2. As described with respect to FIG. 4, the distances may be used by the radar transmitter RTX to determine ranging information regarding objects in the environment. In some implementations, the radar transmitter RTX may establish the beam links 502 and 504 by performing beamforming training operations with the radar receivers RRX1 and RRX2, respectively.

The radar transmitter RTX may establish the beam link 502 with the first radar receiver RRX1 by performing a first sector sweep (SS) 510. During the first sector sweep 510, the radar transmitter RTX and the first radar receiver RRX1 may exchange beamforming frames which may be used to configure or tune their respective antennas for the transmission and reception of beamformed signals. For example, through the exchange of beamforming frames, the radar transmitter RTX may determine an address (Addr_B) and beamforming direction (BF_D1) associated with the first radar receiver RRX1. The first radar receiver RRX1 also may determine an address (Addr_A) associated with the radar transmitter RTX. Further, the radar transmitter RTX and the first radar receiver RRX1 may each determine their distance of separation (L1) based, at least in part, on a round trip time of the beamforming frames or other communication frames exchanged during the session setup phase.

The radar transmitter RTX may further establish the beam link 504 with the second radar receiver RRX2 by performing a second sector sweep 520. During the second sector sweep 520, the radar transmitter RTX and the second radar receiver RRX2 may exchange beamforming frames which may be used to configure or tune their respective antennas for the transmission and reception of beamformed signals. For example, the radar transmitter RTX may determine an address (Addr_C) and beamforming direction (BF_D2) associated with the second radar receiver RRX2. The second radar receiver RRX2 also may determine the address (Addr_A) associated with the radar transmitter RTX. Further, the radar transmitter RTX and the second radar receiver RRX2 may each determine their distance of separation (L2) based, at least in part, on a round trip time of the beamforming frames or other communication frames exchanged during the session setup phase.

In the example of FIG. 5, it assumed that the radar transmitter RTX and radar receivers RRX1 and RRX2 implement phased-array antennas that must be trained for directional beamforming. However, in some other implementations, the radar transmitter RTX may obtain the distances and directions of the radar receivers RRX1 and RRX2 through other means (such as without beamforming training). For example, in some implementations, the radar transmitter RTX and radar receivers RRX1 and RRX2 may communicate via pre-installed antennas at known or fixed locations.

In some implementations, the radar transmitter RTX may provide timing information to the radar receivers RRX1 and RRX2 in one or more beamforming frames exchanged during (or after) the establishment of the beam links 502 and 504. The timing information may be used to synchronize RX clocks in the radar receivers RRX1 and RRX2, respectively, with a TX clock of the radar transmitter RTX. In some aspects, the timing information may indicate a timing offset between a codeword sequence of an upcoming radar frame and the beginning of a pulse sequence of the radar frame. In some other aspects, the timing information may indicate a pulse interval or duration between successive pulses of the upcoming radar frame.

Figure 6:
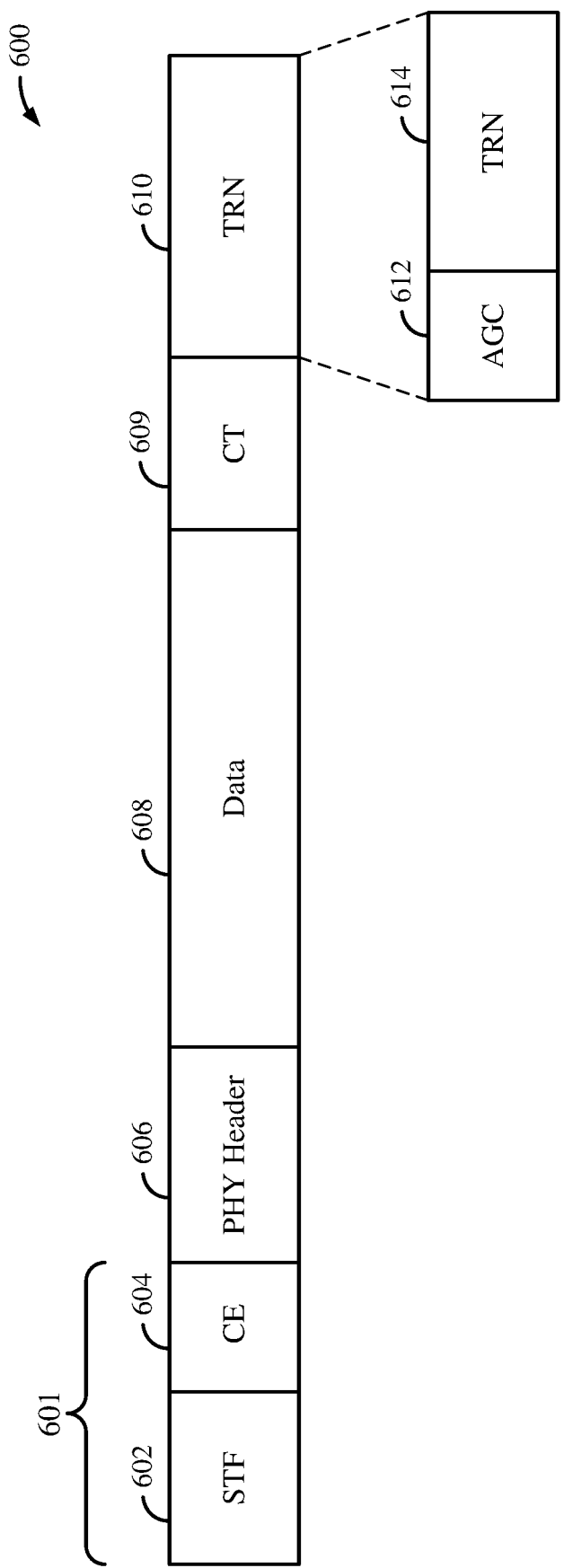
FIG. 6 shows an example protocol data unit (PDU).

FIG. 6 shows an example protocol data unit (PDU) 600 usable for communications between a radar transmitter and one or more radar receivers. In some implementations, the PDU 600 may be one example of a beamforming frame that can be used for beamforming training between a radar transmitter and a radar receiver. In some aspects, the PDU 600 can be configured as a physical layer convergence protocol PDU (PPDU). As shown, the PDU 600 includes a PHY preamble 601, a PHY header 606, a data field 608, a control trailer 609, and a beamforming training field (TRN) 610. The PHY preamble 601 may include a short training field (STF) 602 and a channel estimation field (CE) 604. The STF 602 generally enables a receiving device to detect the PDU 600 as well as perform automatic gain control (AGC) and coarse timing and frequency estimation. The CE field 604 may be used by the receiving device to perform channel estimation. The PHY header 606 includes information associated with the data field 608 including, for example, a modulation and coding scheme (MCS), length, or checksum. The data field 608 may include payload data and padding (if any).

The control trailer 609 may be used to convey new or additional information in the PDU 600 while maintaining backwards compatibility with existing or legacy PDU formats. In some implementations, the control trailer 609 may be used to communicate radar information between radar transmitters and radar receivers. Example radar information may include, but is not limited to, timing offset information, pulse interval information, association identifiers (AIDs) for each intended radar receiver, and any other information that may be useful or necessary for multistatic radar communications.

The TRN field 610 may be used for beamforming training. More specifically, the TRN field 610 may be used by the receiving device to tune or configure its antennas for directional beamforming. For example, the receiving device may determine, based on the TRN field 610, which antenna sectors (of a phased array antenna) should be used for transmitting and receiving corresponding beams. The TRN field 610 may include an AGC subfield 612 and one or more TRN subfields 614. The AGC subfield 612 enables the receiving device to readjust its AGC settings to receive the TRN subfields 614. The TRN subfields 614 may include Golay sequences that can be used to determine an antenna weight vector (AWV) to be applied to the transmit antennas or receive antennas used for beamforming. For example, the AWV may describe the amplitude or phase to be applied to each transmit or receive antenna. The number of TRN subfields 614 may vary depending on whether the TRN field 610 is used for transmit AWV training or receive AWV training.

Figure 7:
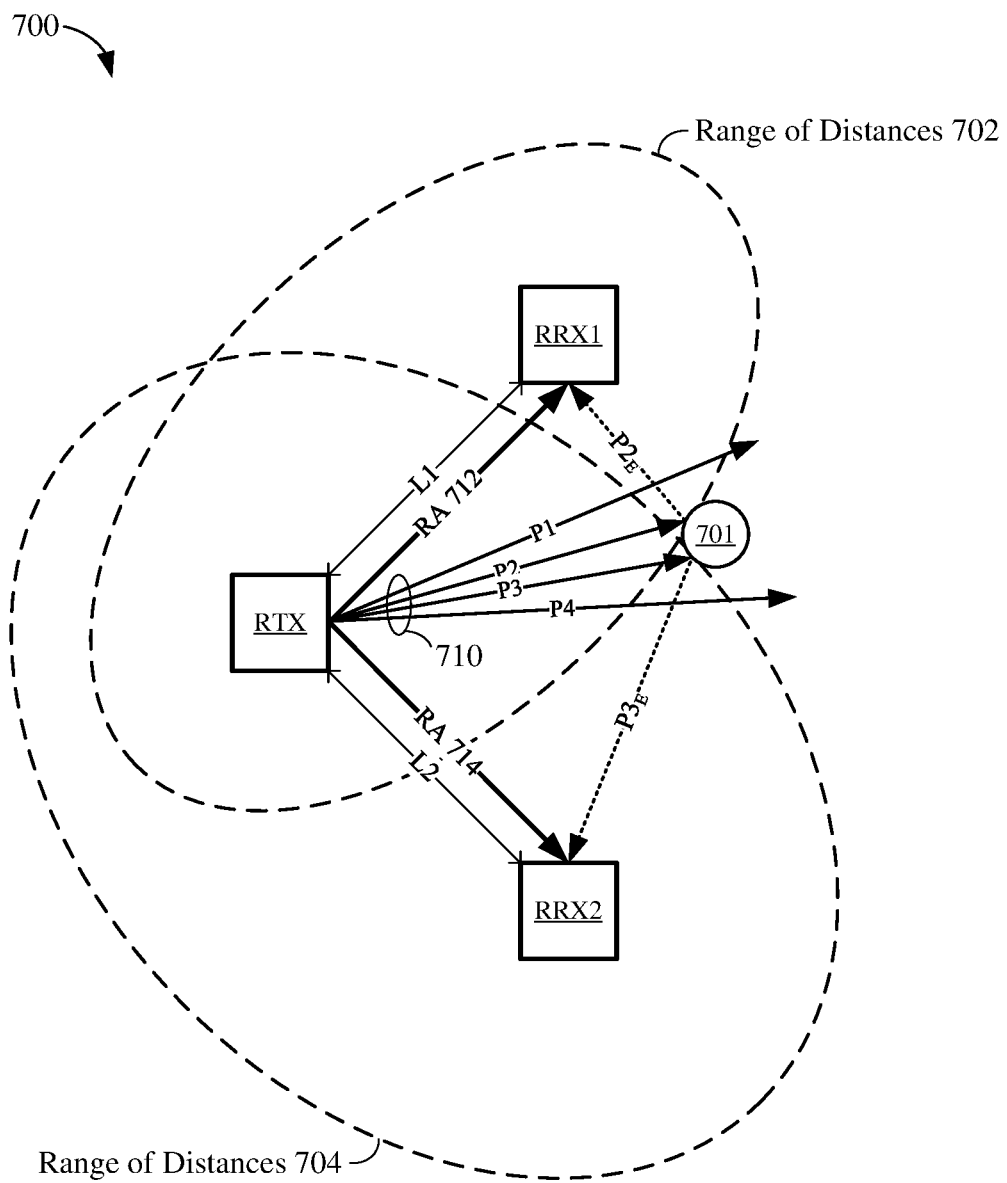
FIG. 7 shows an example multistatic radar system.

FIG. 7 shows an example multistatic radar system 700. The multistatic radar system 700 includes a radar transmitter RTX and multiple spatially diverse radar receivers RRX1 and RRX2. In some implementations, the radar transmitter RTX and radar receivers RRX1 and RRX2 may be examples of the radar transmitter RTX and radar receivers RRX1 and RRX2, respectively, of FIG. 5. Thus, the radar transmitter RTX may be spatially separated from the radar receivers RRX1 and RRX2 by baseline distances L1 and L2, respectively. In the example of FIG. 7, the multistatic radar system 700 may be configured to perform a radar phase of a multistatic radar operation.

During the radar phase, the radar transmitter RTX may transmit radar alert (RA) frames 712 and 714 to the radar receivers RRX1 and RRX2, respectively. The first radar alert frame 712 may be transmitted, using beamforming, in the direction of the first radar receiver RRX1 and the second radar alert frame 714 may be transmitted, using beamforming, in the direction of the second radar receiver RRX2. In some implementations, each of the radar alert frames 712 and 714 may be a clear-to-send (CTS)-to-self frame as defined by, for example, the IEEE 802.11ay amendment to the 802.11 standards. The radar alert frames 712 and 714 may alert the respective radar receivers RRX1 and RRX2 of an upcoming radar frame 710. In some aspects, the radar alert frames 712 and 714 may include timing information that can be used to synchronize RX clocks in the radar receivers RRX1 and RRX2, respectively, with a TX clock of the radar transmitter RTX. In some other aspects, the radar alert frames 712 and 714 may indicate a pulse interval or duration between successive pulses P1-P4. Still further, in some aspects, the radar transmitter RTX may provide the timing information or indicate the pulse intervals to the radar receivers RRX1 and RRX2 during the session setup phase (such as described with reference to FIG. 5).

In some implementations, the radar frame 710 may include a codeword sequence (not shown for simplicity) followed by a sequence of radar pulses P1-P4. The codeword sequence may be used by the radar receivers RRX1 and RRX2 to calculate a relative start time of the sequence of pulses P1-P4. For example, the timing information included in the first radar alert frame 712 (or in beamforming frames exchanged during the session setup phase) may indicate a timing offset or delay between one or more portions of the codeword sequence and the start of the pulse sequence. Upon detecting one or more portions of the codeword sequence, the first radar receiver RRX1 may determine the start time of the pulse sequence relative to its own internal clock. Similarly, the timing information included in the second radar alert frame 714 (or in beamforming frames exchanged during the session setup phase) may indicate a timing offset or delay between one or more portions of the codeword sequence and the start of the pulse sequence. Upon detecting one or more portions of the codeword sequence, the second radar receiver RRX2 may determine the start time of the pulse sequence relative to its own internal clock.

Each of the pulses P1-P4 may be a beamformed RF signal having a particular width and directionality. Although four radar pulses P1, P2, P3 and P4 are shown in the example of FIG. 7, the radar frame 710 may include any number of radar pulses in actual implementations. Objects or surfaces along the trajectory of any of the pulses P1-P4 may cause the pulses to reflect or scatter, producing echoes. In the example of FIG. 7, a target object 701 is located along the path of two of the radar pulses P2 and P3. The pulses P2 and P3 incident on the target object 701 are reflected as echoes $P2_E$ and $P3_E$, respectively. As shown in FIG. 7, the first echo $P2_E$ is reflected in the direction of the first radar receiver RRX1 and the second echo $P3_E$ is reflected in the direction of the second radar receiver RRX2. In some implementations, the radar receivers RRX1 and RRX2 may detect the echoes $P2_E$ and $P3_E$, respectively, based on changes in a channel impulse response (CIR). For example, each of the radar receivers RRX1 and RRX2 may detect an incident echo when the CIR measured by the radar receiver peaks or exceeds a threshold energy level.

In some implementations, each of the radar receivers RRX1 and RRX2 may calculate a time-of-flight (τ) of the respective echoes $P2_E$ and $P3_E$ based, at least in part, on the timing information included in the radar alert frames 712 and 714 (or received during the session setup phase) and the codeword sequence of the radar frame 710. For example, each of the radar receivers RRX1 and RRX2 may use the timing information and codeword sequence to determine a relative start time of the pulse sequence. The radar receivers RRX1 and RRX2 may determine, based on the start time of the pulse sequence and the pulse duration, which of the pulses P1-P4 resulted in the detected echoes $P2_E$ and $P3_E$. In some aspects, the first radar receiver RRX1 may determine that the first echo $P2_E$ is a reflection of the second pulse P2 due to the temporal proximity of P2 to $P2_E$. In some other aspects, the pulses P1-P4 may be encoded with information (such as a unique Golay sequence) that can be used by the receiving devices RRX1 and RRX2 for identification purposes. Accordingly, the first radar receiver RRX1 may determine that the first echo $P2_E$ is a reflection of the second pulse P2 based on information encoded in the second pulse P2. Similarly, the second radar receiver RRX2 may determine that the second echo $P3_E$ is a reflection of the third pulse P3 due to the temporal proximity of P3 to $P3_E$ or information encoded in the third pulse P3.

After identifying the incident pulses P2 and P3 that resulted in the echoes $P2_E$ and $P3_E$, the radar receivers RRX1 and RRX2 may determine the times at which the incident pulses P2 and P3, respectively, were transmitted by the radar transmitter RTX. For example, communications from the radar transmitter RTX to the radar receivers RRX1 and RRX2 undergo a propagation delay based on the propagation speed ($c_p$) of the wireless signals and the distances L1 and L2, respectively, between the devices. Since the propagation speed and distances are known or fixed quantities, each of the radar receivers RRX1 and RRX2 also may know its respective propagation delay. Accordingly, each of the radar receivers RRX1 and RRX2 may calculate the timing of a transmitted pulse at the radar transmitter RTX ($T_{pulse,TX}$), according to Equation 4, as a function of the timing of the transmitted pulse relative to the radar receiver ($T_{pulse,RX}$) and the propagation delay.

$$T_{pulse,TX} = T_{pulse,RX} - \text{Propagation\_Delay} \quad (4)$$

Substituting $T_{pulse,TX}$ (Equation 4) for $T_{pulse}$ in Equation 3 yields:

$$\tau = T_{echo} - T_{pulse,RX} + \text{Propagation\_Delay} \quad (5)$$

With reference to Equation 5, each of the radar receivers RRX1 and RRX2 may calculate a time of flight τ of a respective echo based on the time at which the echo is detected $T_{echo}$, the time at which the corresponding pulse is transmitted $T_{pulse,RX}$ relative to the radar receiver (as determined based on the timing information included in the radar alert frames 712 or 714, or in beamforming frames exchanged during a session setup phase, and the codeword sequence in the radar frame 710), and the propagation delay between the radar receiver and the radar transmitter RTX. In some implementations, each of the radar receivers RRX1 and RRX2 may generate feedback to be reported to the radar transmitter RTX based, at least in part, on the time of flight τ of a detected echo and the timing of the incident pulse which produced the echo.

Figure 8:
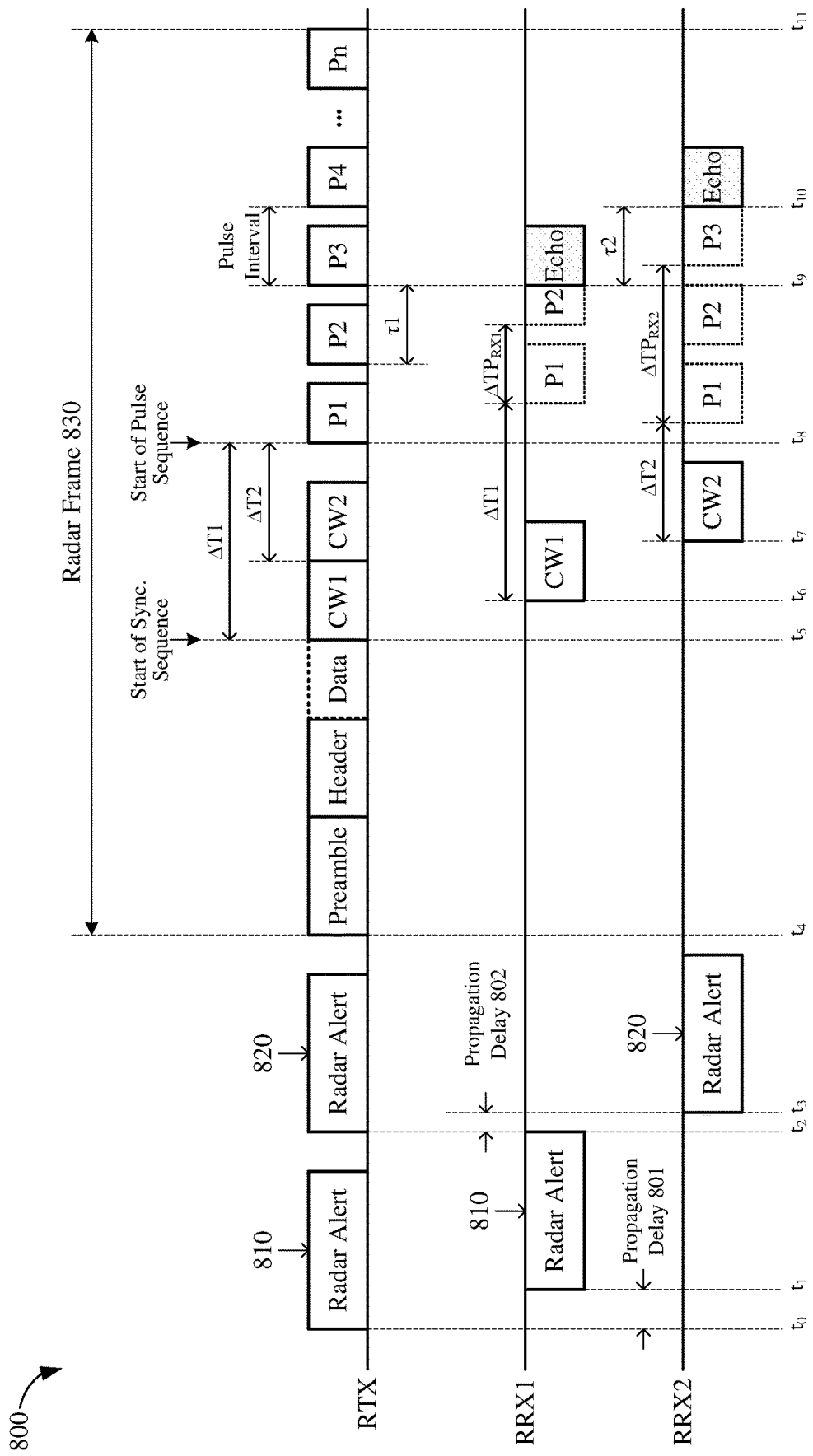
FIG. 8 shows a timing diagram depicting an example multistatic radar communication.

FIG. 8 shows a timing diagram 800 depicting an example multistatic radar communication. The multistatic radar communication may be performed by a radar transmitter RTX and a number of radar receivers RRX1 and RRX2. In some implementations, the radar transmitter RTX and radar receivers RRX1 and RRX2 may belong to a multistatic radar system, such as the multistatic radar system 700 of FIG. 7. Thus, the radar transmitter RTX and the radar receivers RRX1 and RRX2 may be examples of the radar transmitter RTX and the radar receivers RRX1 and RRX2, respectively, of FIG. 7.

At time t0, the radar transmitter RTX transmits a radar alert frame 810 to the first radar receiver RRX1. In some implementations, the radar alert frame 810 may be a CTS-to-self frame in accordance with the IEEE 802.11ay amendment. For example, the receiver address (RA) field of the CTS-to-self frame may include the address of the radar transmitter RTX and may be used to indicate, to the first radar receiver RRX1, the address to which feedback is to be reported during a subsequent phase of the multistatic radar operation. The radar alert frame 810 may be transmitted, using beamforming, in the direction of the first radar receiver RRX1 and may specify the address of the first radar receiver RRX1 to alert the radar receiver of an upcoming radar frame 830.

In some implementations, the radar transmitter RTX may further provide timing information in a control trailer of the radar alert frame 810 (such as the control trailer 609 described with reference to FIG. 6). In some aspects, the timing information may identify one or more unique codewords CW1 or CW2 in the radar frame 830. In some other aspects, the timing information may further indicate a timing offset $\Delta T1$ or $\Delta T2$ between the codewords CW1 or CW2, respectively, and a start of the pulse sequence (at time $t_8$). Still further, in some aspects, the timing information may indicate a pulse interval between successive radar pulses P1-Pn of the radar frame 830. In some other implementations, the codewords CW1/CW2, timing offsets $\Delta T1/\Delta T2$, or pulse interval (collectively referred to as "timing information") may be indicated in one or more beamforming frames exchanged during the session setup phase (such as described with reference to FIG. 5).

The first radar receiver RRX1 receives the radar alert frame 810, at time $t_1$, after a propagation delay 801. In some implementations, upon receiving the radar alert frame 810, the first radar receiver RRX1 may store any timing offset information or pulse interval information included therein. The first radar receiver RRX1 may further listen for the upcoming radar frame 830 to be transmitted by the radar transmitter RTX. In some implementations, the first radar receiver RRX1 may continue listening for the radar frame 830 until it detects one or more of the codewords CW1 or CW2 of the radar frame 830.

At time $t_2$, the radar transmitter RTX transmits a radar alert frame 820 to the second radar receiver RRX2. The radar alert frame 820 may be used to indicate, to the second radar receiver RRX2, the address to which feedback is to be reported during a subsequent phase of the multistatic radar operation. In some implementations, the radar alert frame 820 may be a CTS-to-self frame with an RA field specifying the address of the radar transmitter RTX. The radar alert frame 820 may be transmitted, using beamforming, in a direction of the second radar receiver RRX2 and may specify the address of the second radar receiver RRX2 to alert the radar receiver of the upcoming radar frame 830.

In some implementations, the radar transmitter RTX may further provide timing information in a control trailer of the radar alert frame 820 (such as the control trailer 609 described with reference to FIG. 6). In some aspects, the timing information may identify one or more of the codewords CW1 or CW2 in the radar frame 830. In some other aspects, the timing information may further indicate a timing offset or delay $\Delta T1$ or $\Delta T2$ between the codewords CW1 or CW2, respectively, and the start of the pulse sequence (at time $t_8$). Still further, in some aspects, the timing information may indicate a pulse interval between successive radar pulses P1-Pn of the radar frame 830. In some other implementations, the timing information may be indicated in one or more beamforming frames exchanged during the session setup phase (such as described with reference to FIG. 5).

The second radar receiver RRX2 receives the radar alert frame 820, at time $t_3$, after a propagation delay 802. In some implementations, upon receiving the radar alert frame 820, the second radar receiver RRX2 may store any timing offset information or pulse interval information included therein. The second radar receiver RRX2 may further listen for the upcoming radar frame 830 to be transmitted by the radar transmitter RTX. In some implementations, the second radar receiver RRX2 may continue listening for the radar frame 830 until it detects one or more of the codewords CW1 or CW2 of the radar frame 830.

The radar transmitter RTX transmits the radar frame 830 from times $t_4$ to $t_{11}$. In some implementations, the radar frame 830 may be a new type of PPDU based, at least in part, on a packet structure defined by existing IEEE 802.11 standards (such as the PDU 600 of FIG. 6). For example, the radar frame 830 may include a preamble, a header, a codeword sequence, and one or more radar pulses P1-Pn. With reference for example to FIG. 6, the preamble and header of the radar frame 830 may be one example of the PHY preamble 601 and PHY header 606, respectively, of the PDU 600. However, the TRN field 610 (or TRN subfields 614) of the PDU 600 may be repurposed as the codeword sequence and radar pulse sequence of the radar frame 830. In some aspects, the radar frame 830 may include payload data (such as provided in the data field 608 of FIG. 6). In some other aspects, the radar frame 830 may not include any payload data. The codeword sequence may include one or more unique codewords CW1 and CW2. Although only two codewords CW1 and CW2 are shown in the example of FIG. 8, the radar frame 830 may include any number of codewords in actual implementations.

In some implementations, each of the codewords may represent a sequence of bipolar symbols (+1 or −1) collectively referred to as a Golay sequence. Due to their autocorrelation characteristics, complementary Golay sequences are often used for channel estimation. For example, existing IEEE 802.11 standards describe techniques for generating Golay sequences that may be included in a beamforming training field of a PPDU (such as the TRN field 610 of FIG. 6). In some aspects, the Golay sequences may be repurposed for the codeword sequence of the radar frame 830. For example, different Golay sequences may be assigned or otherwise associated with different "colors" which may be known to the radar receivers RRX1 and RRX2 (such as from the session setup phase). Accordingly, each of the codewords CW1 and CW2 may represent a different colored Golay sequence.

In some implementations, the radar transmitter RTX may transmit various portions of the radar frame 830, using beamforming, in different directions. In the example of FIG. 8, neither the first radar receiver RRX1 nor the second radar receiver RRX2 receives the preamble or header of the radar frame 830. However, beginning at time $t_5$, at least one of the codewords CW1 or CW2 in the codeword sequence may be transmitted (using beamforming) in a direction of each of the receivers RRX1 and RRX2. As shown in FIG. 8, the first codeword CW1 is transmitted in the direction of the first radar receiver RRX1 and the second codeword CW2 is transmitted in the direction of the second radar receiver RRX2. In some implementations, the pulses P1-Pn may be one example of one of the pulses P1-P4 of FIG. 7. Thus, each of the pulses P1-Pn may be transmitted, using beamforming, in a different direction.

The first radar receiver RRX1 receives the first codeword CW1 at time $t_6$. Upon receiving the first codeword CW1, the first radar receiver RRX1 may determine a relative start of the pulse sequence ($t_6+\Delta T1$) based on the timing offset $\Delta T1$ associated with the first codeword CW1. Further, the first radar receiver RRX1 may begin tuning (or positioning) its receive antennas in various beam-trained directions (as determined during the session setup phase) to detect echoes of the radar pulses P1-Pn. For example, the first radar receiver RRX1 may reconfigure its receive antennas to detect echoes from objects that may be located anywhere in the vicinity of the first radar receiver RRX1. In the example of FIG. 8, the first radar receiver RRX1 detects an echo at time $t_9$. The first radar receiver RRX1 may further determine, based on the relative start of the pulse sequence ($t_6+\Delta T1$) and the pulse interval, that the received echo is a reflection of the second pulse P2. The first radar receiver RRX1 may then determine a time of flight it of the second pulse P2 (such as by using Equation 5).

The second radar receiver RRX2 receives the first codeword CW2 at time $t_7$. Upon receiving the second codeword CW2, the second radar receiver RRX2 may determine a relative start of the pulse sequence ($t_7+\Delta T2$) based on the timing offset $\Delta T2$ associated with the second codeword CW2. Similar to the first radar receiver RRX1, the second radar receiver RRX2 may begin tuning (or positioning) its receive antennas in various beam-trained directions (as determined during the session setup phase) to detect echoes of the radar pulses P1-Pn. In the example of FIG. 8, the second radar receiver RRX2 detects an echo at time $t_{10}$. The second radar receiver RRX2 may further determine, based on the relative start of the pulse sequence ($t_7+\Delta T2$) and the pulse interval, that the received echo is a reflection of the third pulse P3. The second radar receiver RRX2 may then determine a time of flight $\tau 2$ of the third pulse P3 (such as by using Equation 5).

Figure 9:
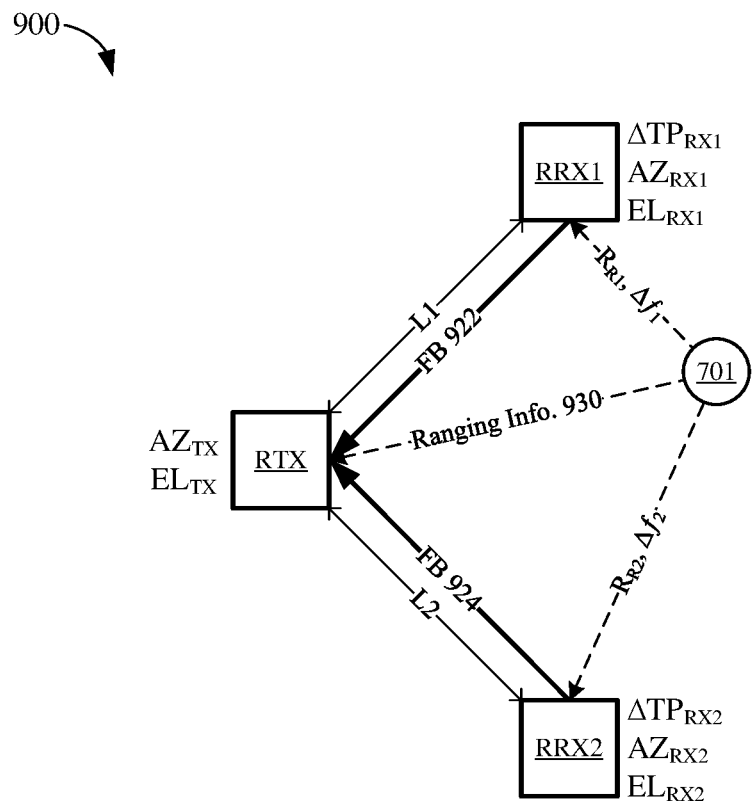
FIG. 9 shows an example multistatic radar system.

FIG. 9 shows an example multistatic radar system 900. The multistatic radar system 900 includes a radar transmitter RTX and multiple spatially diverse radar receivers RRX1 and RRX2. In some implementations, the radar transmitter RTX and radar receivers RRX1 and RRX2 may be examples of the radar transmitter RTX and radar receivers RRX1 and RRX2, respectively, of FIGS. 5 and 7. Thus, the radar transmitter RTX may be spatially separated from the radar receivers RRX1 and RRX2 by baseline distances L1 and L2, respectively. In the example of FIG. 9, the multistatic radar system 900 may be configured to perform a measurement delivery phase of a multistatic radar operation.

During the measurement delivery phase, each of the radar receivers RRX1 and RRX2 may generate feedback (FB) 922 and 924, respectively, to be reported to the radar transmitter RTX. With reference for example to FIG. 5, each of the radar receivers RRX1 and RRX2 may report its feedback 922 and 924 via the beam links 502 and 504, respectively, established during the session setup phase of the multistatic radar operation. The feedback 922 and 924 may include any information pertaining to the echoes detected by the radar receivers RRX1 and RRX2, respectively. In some implementations, the radar transmitter RTX may determine ranging information 930 about the target object 701 based on the aggregate feedback 922 and 924 reported by the radar receivers RRX1 and RRX2. The ranging information 930 may include, but is not limited to, a distance, direction, or velocity of the target object 701 in relation to the radar transmitter RTX. For example, the radar transmitter may map the position or change in position of the target object 701 with respect to a universal coordinate space.

In some implementations, the feedback 922 or 924 may indicate which pulses (in the pulse sequence) produced the echoes detected by the radar receivers RRX1 and RRX2, respectively. For example, the feedback 922 or 924 may include a relative timing of the pulse ($\Delta TP$) with respect to the start of the pulse sequence. In some aspects, the relative timing of each pulse $\Delta TP$ may be reported as a multiple of the pulse interval. With reference for example to FIG. 8, the first radar receiver RRX1 may determine that the second pulse P2 (which produced the echo detected by RRX1) is transmitted one pulse interval after the transmission of the first pulse ($\Delta TP_{RX1}=1\times$ pulse interval). Similarly, the second radar receiver RRX2 may determine that the third pulse P3 (which produced the echo detected by RRX2) is transmitted two pulse intervals after the transmission of the first pulse ($\Delta TP_{RX2}=2\times$ pulse interval).

In some implementations, the feedback 922 or 924 may indicate an angle of arrival (AoA) of each echo detected by the radar receivers RRX1 and RRX2, respectively. With reference for example to FIG. 4, the AoA ($\theta_R$) may be determined based on the antenna sector used by the radar receiver to receive the corresponding echo. In some aspects, the AoA may be represented by an azimuth (AZ) and elevation (EL). More specifically, the azimuth and elevation describe, in a three-dimensional space, the AoA of the detected pulse relative to the positioning (or antenna sectors) of the particular radar receiver. With reference for example to FIG. 7, the first radar receiver RRX1 may determine an azimuth ($AZ_{RX1}$) and elevation ($EL_{RX1}$) the first echo $P2_E$ incident upon its antenna array. Similarly, the second radar receiver RRX2 may determine an azimuth ($AZ_{RX2}$) and elevation ($EL_{RX2}$) of the second echo $P3_E$ incident upon its antenna array.

In some implementations, the feedback 922 or 924 may indicate a time of flight $\tau$ of each echo detected by the radar receivers RRX1 and RRX2, respectively. With reference for example to FIG. 7, the first radar receiver RRX1 may report the time of flight $\tau 1$ determined for the second pulse P2 and the second radar receiver RRX2 may report the time of flight $\tau 2$ determined for the third pulse P3. In some implementations, the feedback 922 or 924 also may indicate a distance ($R_R$) of a target object relative to each radar receiver RRX1 and RRX2, respectively. For example, the first radar receiver RRX1 may determine its distance $R_{R1}$ to the target object 701 based on the time of flight $\tau 1$ of the second pulse P2, the AoA of the first echo $P2_E$, and the baseline distance L1 to the radar transmitter RTX (such as by using Equations 1-3). Similarly, the second radar receiver RRX2 may determine its distance $R_{R2}$ to the target object 701 based on the time of flight $\tau 2$ of the third pulse P3, the AoA of the second echo $P3_E$, and the baseline distance L2 to the radar transmitter RTX (such as by using Equations 1-3).

In some other implementations, the feedback 922 or 924 may include raw or unprocessed data associated with each echo detected by the radar receivers RRX1 and RRX2, respectively. In some aspects, the raw data may include a CIR measurement associated with each detected echo. For example, the first radar receiver RRX1 may report a first CIR measurement associated with the first echo $P2_E$ and the second radar receiver RRX2 may report a second CIR measurement associated with the second echo $P3_E$. In some implementations, the feedback also may indicate a delay ($\Delta \tau$) associated with the CIR measurement. Similar to the time of flight $\tau$, the CIR delay $\Delta \tau$ represents a delay between the time at which the CIR measurement is generated by the radar receiver and the time at which the pulse associated with the CIR measurement is transmitted by the radar transmitter RTX. For example, the first radar receiver RRX1 may determine the delay (Δτ1) from the transmission of the second pulse P2 to the generation of the first CIR measurement and the second radar receiver RRX2 may determine the delay (Δτ2) from the transmission of the third pulse P3 to the generation of the second CIR measurement.

In some implementations, the radar transmitter RTX may determine its relative distance ($R_T$) to the target object 701 based on the feedback 922 and 924 received from the radar receivers RRX1 and RRX2, respectively. In some aspects, the radar transmitter RTX may calculate the distance $R_T$ based on the angle of departure (AoD) associated with one or more of the incident pulses (such as described with respect to FIG. 4). With reference for example to FIG. 4, the AoD ($θ_T$) may be determined based on the antenna sector used by the radar transmitter RTX to transmit the pulse which produced a particular echo. In some aspects, the AoD may be represented by an azimuth ($AZ_{TX}$) and elevation ($EL_{TX}$) associated with the radar transmitter RTX. In some implementations, the radar transmitter RTX may map the position of the target object 701 to a universal coordinate space based on a combination of the distances $R_T$, $R_{R1}$, and $R_{R2}$, azimuth angles $AZ_{TX}$, $AZ_{RX1}$, $AZ_{RX2}$, and elevation angles $EL_{TX}$, $EL_{RX1}$, and $EL_{RX2}$.

In some other implementations, the radar transmitter RTX may determine a distance or position of the target object 701 based on the intersection of timing information received from the radar receivers RRX1 and RRX2. For example, as shown in FIG. 7, the time-of-flight information τ1 received from the first radar receiver RRX1 indicates a range of distances 702 around the radar transmitter RTX and the first radar receiver RRX1 in which the target object 701 may be located. Similarly, the time-of-flight information τ2 received from the second radar receiver RRX2 indicates a range of distances 704 around the radar transmitter RTX and the second radar receiver RRX2 in which the target object 701 may be located. Accordingly, the radar transmitter RTX may determine a more precise location or distance of the target object 701 based on the intersection of the range of distances 702 and the range of distances 704 (such as the intersection of the ellipses 702 and 704).

Still further, in some implementations, the radar transmitter RTX may determine a velocity of the target object 701 based on Doppler shifts detected by the radar receivers RRX1 and RRX2 across multiple radar frames. For example, the radar transmitter RTX may transmit a number (N) of radar frames that are similar, if not identical, to the radar frame 830. More specifically, in each of the radar frames, the radar transmitter RTX may retransmit the pulses P1-Pn in the same directions in which they are transmitted in the radar frame 830. As a result, any changes in the times of flight τ1 or τ2 of the echoes detected by the respective radar receivers RRX1 and RRX2, across multiple radar frames, may be attributed to movement of the target object 701. For example, the first radar receiver RRX1 may detect Doppler shifts ($Δf_1$) associated with changes in the times of flight τ1 associated with a first echo $P2_E$ detected across two or more radar frames. Similarly, the second radar receiver RRX2 may detect Doppler shifts ($Δf_2$) associated with changes in the times of flight τ2 associated with a second echo $P3_E$ detected across two or more radar frames.

In some implementations, the radar receivers RRX1 and RRX2 may further report the Doppler shifts $Δf_1$ and $Δf_2$, respectively, back to the radar transmitter RTX (as feedback 922 and 924). The radar transmitter RTX may then determine a velocity ($\vec{v}$) of the target object 701 based on the Doppler shifts $Δf_1$ and $Δf_2$ and other information reported by the radar receivers RRX1 and RRX2 (such as $R_{R1}$, $AZ_{RX1}$, $EL_{RX1}$, $R_{R2}$, $AZ_{RX2}$, and $EL_{RX2}$). For example, the velocity vector $\vec{v}$ may represent a movement of the target object 701 in relation to the universal coordinate space ($\vec{v} = [V_x, V_y]^T$, where $V_x$ represents a projection of the velocity along a first axis of the coordinate space and $V_y$ represents a projection of the velocity along a second axis of the coordinate space). In some other implementations, the radar transmitter RTX may determine the Doppler shifts $Δf_1$ and $Δf_2$ associated with the target object 701 based on the distances $R_{R1}$ and $R_{R2}$, times of flight τ1 and τ2, or CIR delays Δτ1 and Δτ2 reported by the radar receivers RRX1 and RRX2, respectively, in response to two or more radar frames.

In the example of FIG. 9, the radar transmitter RTX may determine the velocity of the object 701 in a two-dimensional coordinate space (represented by x and y). However, multistatic radar systems including 3 or more radar receivers may be capable of determining the velocity of an object in three-dimensional space in accordance with the implementations described herein. For example, a radar transmitter may determine a three-dimensional velocity vector associated with a target object based on Doppler shifts reported by three different radar receivers.

Figure 10:
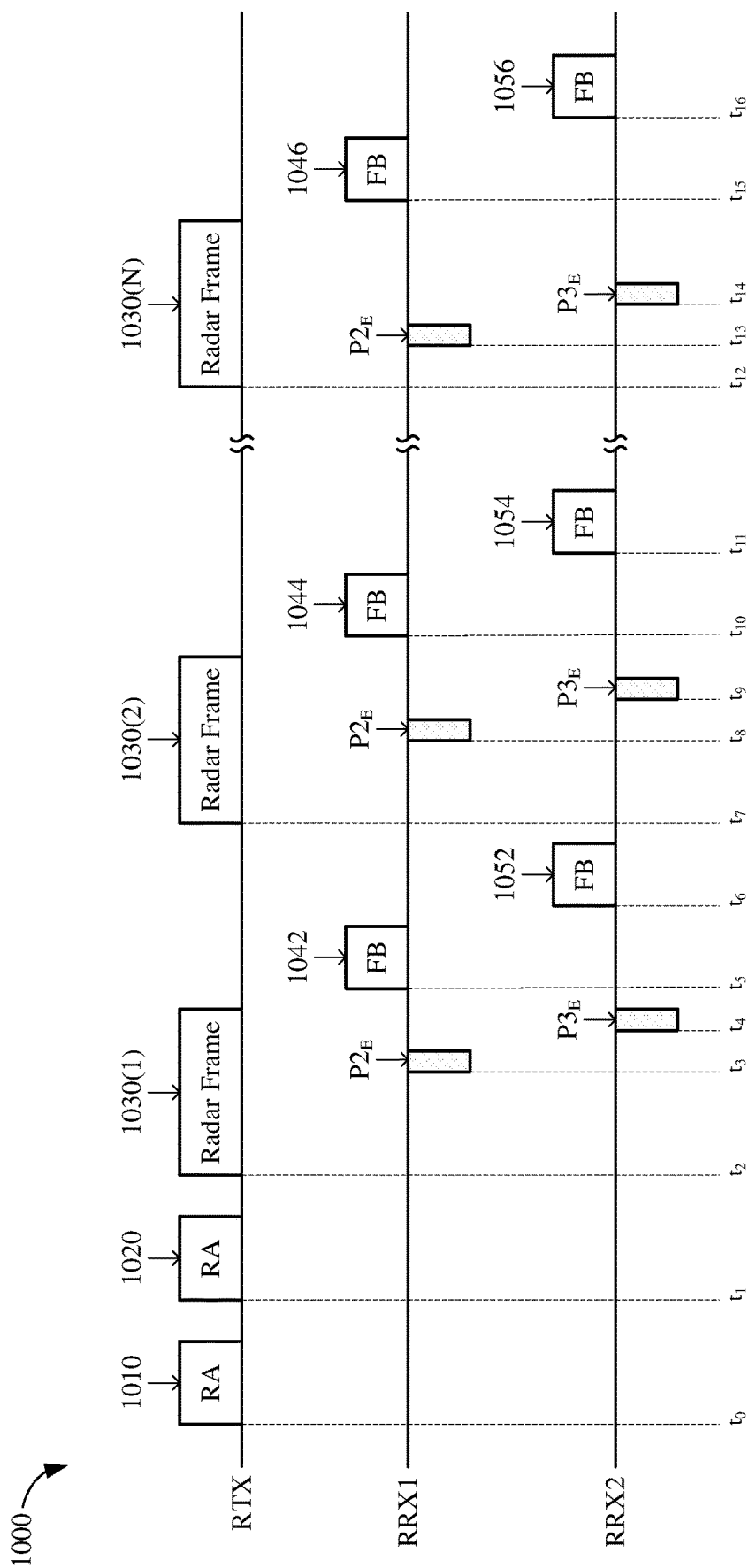
FIG. 10 shows a timing diagram depicting an example multistatic radar communication.

FIG. 10 shows a timing diagram 1000 depicting an example multistatic radar communication. The multistatic radar communication may be performed by a radar transmitter RTX and a number of radar receivers RRX1 and RRX2. In some implementations, the radar transmitter RTX and radar receivers RRX1 and RRX2 may belong to a multistatic radar system, such as any of the multistatic radar system 500, 700, or 900 of FIGS. 5, 7 and 9, respectively. Thus, the radar transmitter RTX and the radar receivers RRX1 and RRX2 may be examples of the radar transmitter RTX and the radar receivers RRX1 and RRX2, respectively, of any of FIG. 5, 7 or 9.

At time $t_0$, the radar transmitter RTX transmits a radar alert frame 1010 to the first radar receiver RRX1. In some implementations, the radar alert (RA) frame 1010 may be one example of the radar alert frame 810 of FIG. 8. For example, the radar alert frame 1010 may be a CTS-to-self frame capable of alerting the first radar receiver RRX1 of an upcoming radar frame 1030 or sequence of N radar frames 1030(1)-1030(N). The radar alert frame 1010 also may indicate an address (of the radar transmitter RTX) to which feedback is to be reported by the first radar receiver RRX1.

At time $t_1$, the radar transmitter RTX transmits a radar alert frame 1020 to the second radar receiver RRX2. In some implementations, the radar alert frame 1020 may be one example of the radar alert frame 820 of FIG. 8. In some implementations, the radar alert frame 1020 may be a CTS-to-self frame capable of alerting the second radar receiver RRX2 of the upcoming radar frame 1030 or sequence of N radar frames 1030(1)-1030(N). The radar alert frame 1020 also may indicate an address (of the radar transmitter RTX) to which feedback is to be reported by the second radar receiver RRX2.

At time $t_2$, the radar transmitter RTX transmits a first radar frame 1030(1). In some implementations, the first radar frame 1030(1) may be one example of the radar frame 830 of FIG. 8. For example, the first radar frame 1030(1) may include a sequence of pulses P1-Pn. The radar transmitter RTX may transmit each of the pulses P1-Pn, using beamforming, in a different direction. With reference for example to FIG. 7, the first pulse P1 may be transmitted in a first direction, the second pulse P2 may be transmitted in a second direction, the third pulse P3 may be transmitted in a third direction, and the fourth pulse P4 may be transmitted in a fourth direction.

At time $t_3$, the first radar receiver RRX1 detects an echo $P2_E$ of the second pulse P2 in the sequence of pulses P1-Pn in the first radar frame 1030(1). At time $t_4$, the second radar receiver RRX2 detects an echo $P3_E$ of the third pulse P3 in the sequence of pulses P1-Pn in the first radar frame 1030(1). At time $t_5$, the first radar receiver RRX1 transmits feedback 1042, based on the echo $P2_E$ detected at time $t_3$, to the radar transmitter RTX. At time $t_6$, the second radar receiver RRX2 transmits feedback 1052, based on the echo $P3_E$ detected at time $t_4$, to the radar transmitter RTX. The feedback 1042 and 1052 may include any of the feedback described with respect to FIG. 9.

At time $t_7$, the radar transmitter RTX transmits a second radar frame 1030(2). In some implementations, the second radar frame 1030(2) may be one example of the radar frame 830 of FIG. 8. For example, the second radar frame 1030(2) also may include the sequence of pulses P1-Pn. The radar transmitter RTX may retransmit each of the pulses P1-Pn, using beamforming, in the same directions in which they were transmitted in the first radar frame 1030(1). With reference for example to FIG. 7, the first pulse P1 may be retransmitted in the first direction, the second pulse P2 may be retransmitted in the second direction, the third pulse P3 may be retransmitted in the third direction, and the fourth pulse P4 may be retransmitted in the fourth direction.

At time $t_8$, the first radar receiver RRX1 detects an echo $P2_E$ of the second pulse P2 in the sequence of pulses P1-Pn in the second radar frame 1030(2). At time $t_9$, the second radar receiver RRX2 detects an echo $P3_E$ of the third pulse P3 in the sequence of pulses P1-Pn in the second radar frame 1030(2). At time $t_{10}$, the first radar receiver RRX1 transmits feedback 1044, based on the echo $P2_E$ detected at time $t_8$, to the radar transmitter RTX. At time $t_{11}$, the second radar receiver RRX2 transmits feedback 1054, based on the echo $P3_E$ detected at time $t_9$, to the radar transmitter RTX. The feedback 1044 and 1054 may include any of the feedback described with respect to FIG. 9.

In some implementations, the first radar receiver RRX1 may determine a Doppler shift $\Delta f_1$ associated with the echoes $P2_E$ detected at times $t_3$ and $t_8$. For example, the Doppler shift $\Delta f_1$ may correspond to a change in the time of flight $\tau 1$ of the echo $P2_E$ in the second radar frame 1030(2) compared to the first radar frame 1030(1). In some implementations, the second radar receiver RRX2 may determine a Doppler shift $\Delta f_2$ associated with the echoes $P3_E$ detected at times $t_4$ and $t_9$. For example, the Doppler shift $\Delta f_2$ may correspond to a change in the time of flight $\tau 2$ of the echo $P3_E$ in the second radar frame 1030(2) compared to the first radar frame 1030(1). The radar receivers RRX1 and RRX2 may report the Doppler shifts $\Delta f_1$ and $\Delta f_2$, respectively, to the radar transmitter RTX (in the feedback 1044 and 1054). In some implementations, the radar transmitter RTX may determine a velocity $\vec{v}$ of a target object based on the Doppler shifts $\Delta f_1$ and $\Delta f_2$ and other information reported by the radar receivers RRX1 and RRX2.

At time $t_{12}$, the radar transmitter RTX transmits an $N^{th}$ radar frame 1030(N). In some implementations, the $N^{th}$ radar frame 1030(N) may be one example of the radar frame 830 of FIG. 8. For example, the $N^{th}$ radar frame 1030(N) also may include the sequence of pulses P1-Pn. The radar transmitter RTX may retransmit each of the pulses P1-Pn, using beamforming, in the same directions in which they were transmitted in the preceding radar frames 1030(1) and 1030(2). With reference for example to FIG. 7, the first pulse P1 may be retransmitted in the first direction, the second pulse P2 may be retransmitted in the second direction, the third pulse P3 may be retransmitted in the third direction, and the fourth pulse P4 may be retransmitted in the fourth direction.

At time $t_{13}$, the first radar receiver RRX1 detects an echo $P2_E$ of the second pulse P2 in the sequence of pulses P1-Pn in the $N^{th}$ radar frame 1030(N). At time $t_{14}$, the second radar receiver RRX2 detects an echo $P3_E$ of the third pulse P3 in the sequence of pulses P1-Pn in the $N^{th}$ radar frame 1030(N). At time $t_{15}$, the first radar receiver RRX1 transmits feedback 1046, based on the echo $P2_E$ detected at time $t_{13}$, to the radar transmitter RTX. At time $t_{16}$, the second radar receiver RRX2 transmits feedback 1056, based on the echo $P3_E$ detected at time $t_{14}$, to the radar transmitter RTX. The feedback 1046 and 1056 may include any of the feedback described with respect to FIG. 9.

In some implementations, the first radar receiver RRX1 may determine a Doppler shift $\Delta f_1$ based on differences in the time of flight of the echo $P2_E$ detected at time $t_3$ compared to the time of flight of the echo $P2_E$ from any previously transmitted radar frame 1030. In some implementations, the second radar receiver RRX2 may determine a Doppler shift $\Delta f_2$ based on differences in the time of flight of the echo $P3_E$ detected at time $t_4$ compared to the time of flight of the echo $P3_E$ from any previously transmitted radar frame 1030. The radar receivers RRX1 and RRX2 may report the Doppler shifts $\Delta f_1$ and $\Delta f_2$, respectively, to the radar transmitter RTX (in the feedback 1046 and 1056). In some implementations, the radar transmitter RTX may determine a velocity $\vec{v}$ of a target object based on the Doppler shifts $\Delta f_1$ and $\Delta f_2$ and other information reported by the radar receivers RRX1 and RRX2.

Figure 11A:
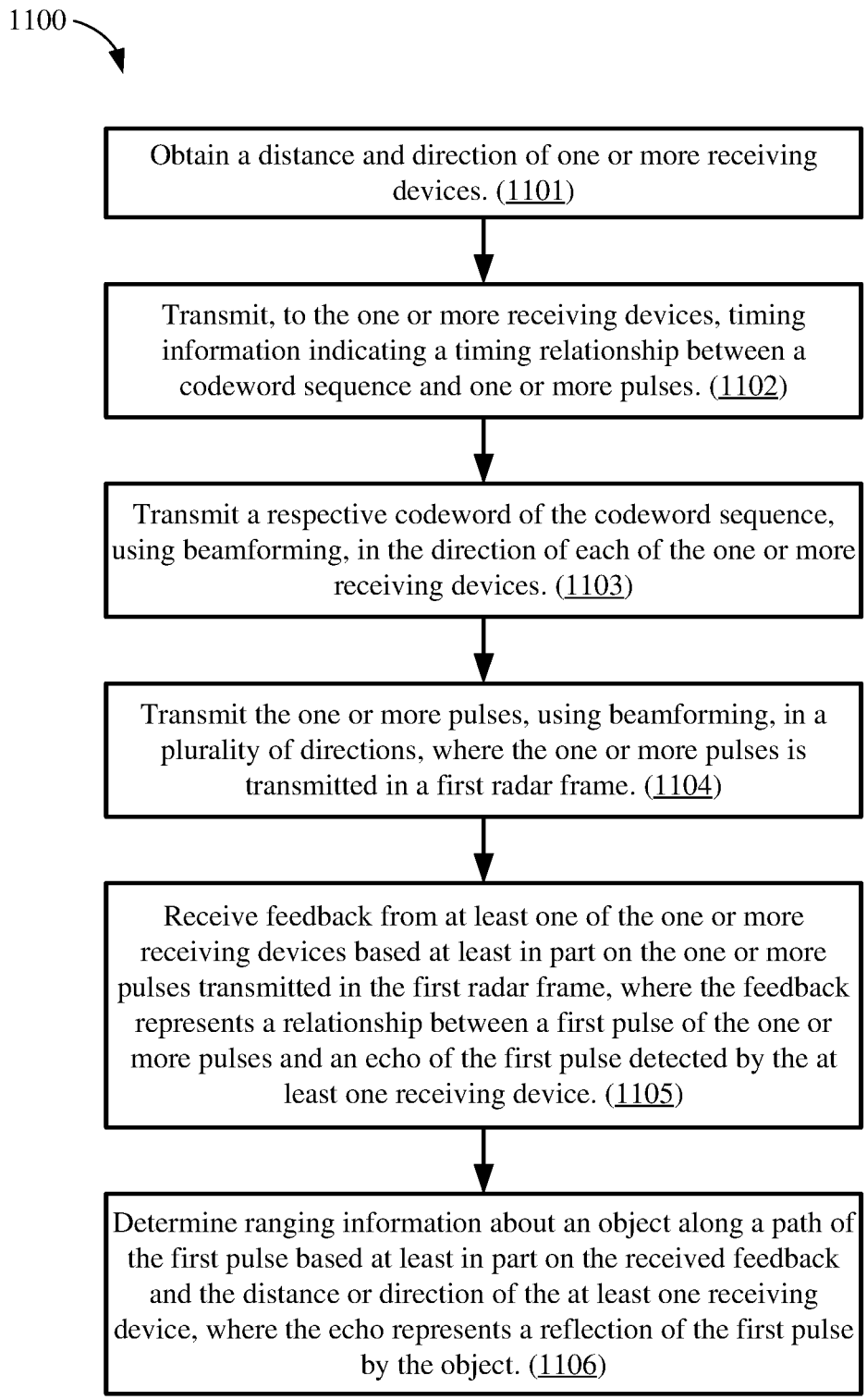
FIG. 11A shows an illustrative flowchart depicting an example wireless communication operation.

FIG. 11A shows an illustrative flowchart depicting an example wireless communication operation 1100. The example operation 1100 may be performed by a wireless communication device such as any of the radar transmitters 410 or RTX of FIGS. 4-10.

The wireless communication device obtains a distance and direction of one or more receiving devices (1101). The wireless communication device transmits, to the one or more receiving devices, timing information indicating a timing relationship between a codeword sequence and one or more pulses (1102). The wireless communication device transmits a respective codeword of the codeword sequence, using beamforming, in the direction of each of the one or more receiving devices (1103). The wireless communication device transmits the one or more pulses, using beamforming, in a plurality of directions, where the one or more pulses is transmitted in a first radar frame (1104). The wireless communication device receives feedback from at least one of the one or more receiving devices based at least in part on the one or more pulses transmitted in the first radar frame, where the feedback represents a relationship between a first pulse of the one or more pulses and an echo of the first pulse detected by the at least one receiving device (1105). The wireless communication device further determines ranging information about an object along a path of the first pulse based at least in part on the received feedback and the distance or direction of the at least one receiving device, where the echo represents a reflection of the first pulse by the object (1106). The process 1100 may include additional aspects, such as any single aspect or any combination of aspects described below or in connection with one or more other aspects described elsewhere herein.

In a first aspect, the ranging information may include at least one of a distance, direction, or velocity of the object in relation to the wireless communication device.

In a second aspect, alone or in combination with the first aspect, the process 1100 may include transmitting, to the one or more receiving devices, one or more radar alert frames preceding the codeword sequence, where each of the radar alert frames is transmitted in the direction of a respective one of the receiving devices and indicating an address of the respective receiving device and an address to which the feedback is to be sent.

In a third aspect, alone or in combination with one or more of the first and second aspects, transmitting the one or more pulses may include dynamically changing an antenna configuration of the wireless communication device to transmit the one or more pulses in the plurality of directions, each antenna configuration being associated with a respective one of the plurality of directions.

In a fourth aspect, alone or in combination with one or more of the first through third aspects, the feedback may indicate a respective pulse of the one or more pulses for which an echo is detected by the at least one receiving device.

In a fifth aspect, alone or in combination with one or more of the first through fourth aspects, the feedback may indicate at least one of an azimuth or an elevation of an angle of arrival (AOA) of the echo in relation to the at least one receiving device.

In a sixth aspect, alone or in combination with one or more of the first through fifth aspects, the feedback may indicate a delay between the transmission of the first pulse and the detection of the echo by the at least one receiving device.

In a seventh aspect, alone or in combination with one or more of the first through sixth aspects, the feedback may indicate a channel impulse response (CIR) associated with the echo and a delay between the transmission of the first pulse and the measuring of the CIR by the at least one receiving device.

In an eighth aspect, alone or in combination with one or more of the first through seventh aspects, the feedback indicates a distance or Doppler shift measured by the at least one receiving device in relation to the object.

Figure 11B:
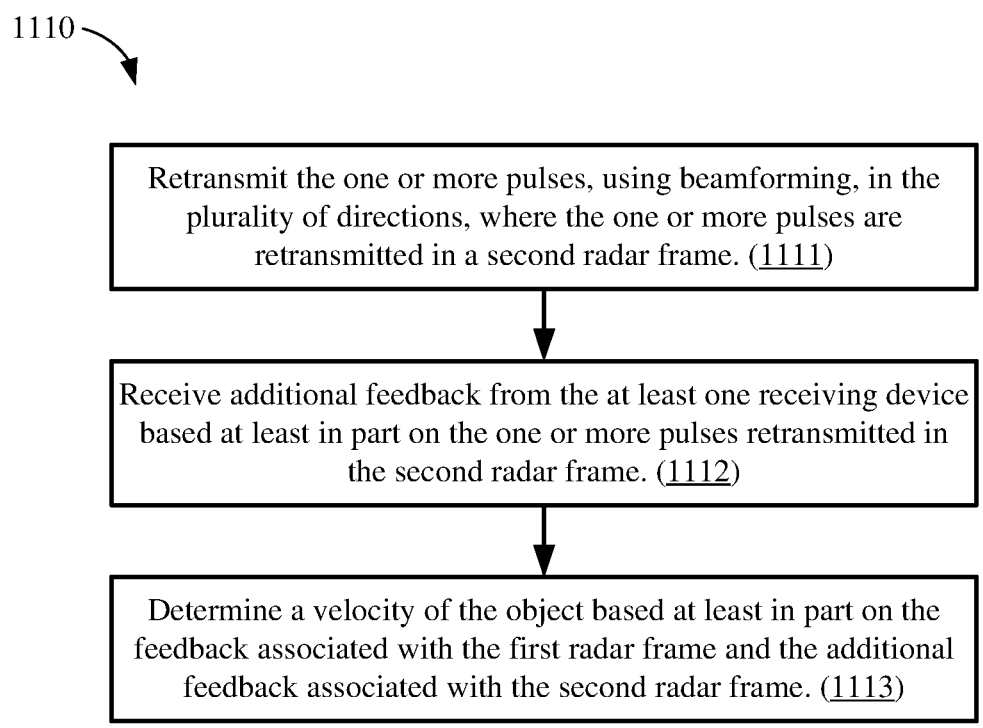
FIG. 11B shows an illustrative flowchart depicting an example wireless communication operation.

FIG. 11B shows an illustrative flowchart depicting an example wireless communication operation 1110. The example operation 1110 may be performed by a wireless communication device such as any of the radar transmitters 410 or RTX of FIGS. 4-10. In some implementations, the example operation 1110 may be performed after the wireless communication operation 1100 of FIG. 11A.

The wireless communication device retransmits the one or more pulses, using beamforming, in the plurality of directions, where the one or more pulses are transmitted in a second radar frame (1111). The wireless communication device receives additional feedback from the at least one receiving device based at least in part on the one or more pulses retransmitted in the second radar frame (1112). The wireless communication device determines a velocity of the object based at least in part on the feedback associated with the first radar frame and the additional feedback associated with the second radar frame (1113).

Figure 12A:
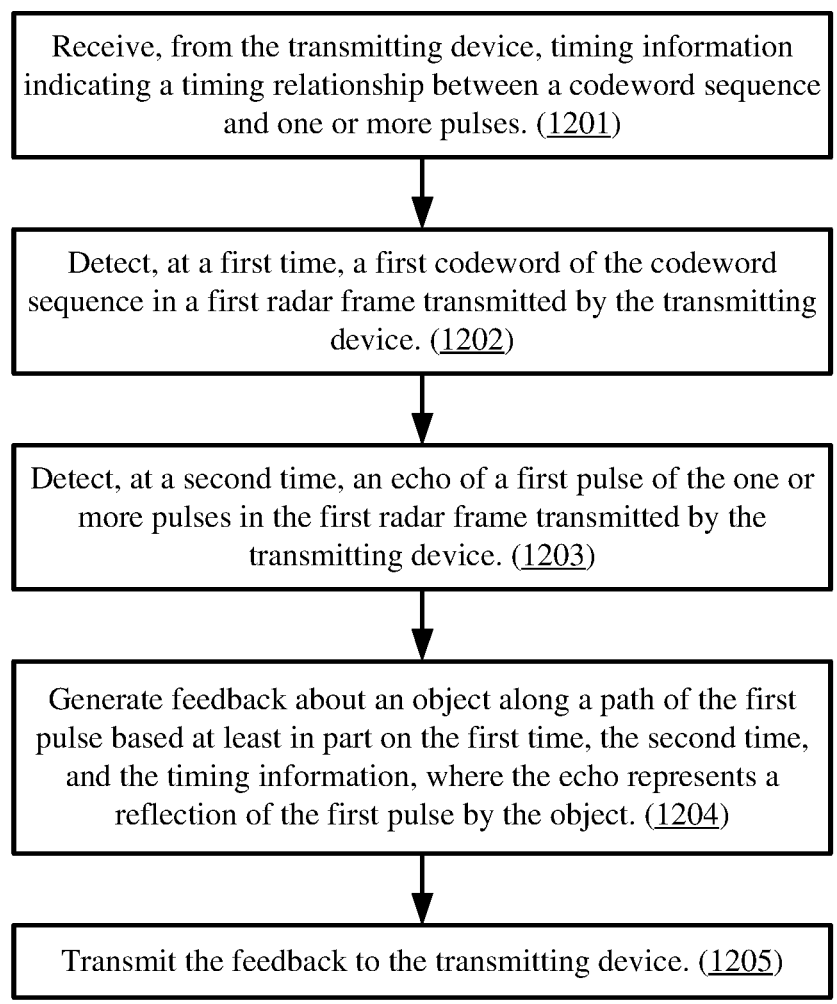
FIG. 12A shows an illustrative flowchart depicting an example wireless communication operation.

FIG. 12A shows an illustrative flowchart depicting an example wireless communication operation 1200. The example operation 1200 may be performed by a wireless communication device such as any of the radar receivers 420, RRX1, or RRX2 of FIGS. 4-10.

The wireless communication device receives, from the transmitting device, timing information indicating a timing relationship between a codeword sequence and one or more pulses (1201). The wireless communication device detects, at a first time, a first codeword of the codeword sequence in a first radar frame transmitted by the transmitting device (1202). The wireless communication device detects, at a second time, an echo of a first pulse of the one or more pulses in the first radar frame transmitted by the transmitting device (1203). The wireless communication device generates feedback about an object along a path of the first pulse based at least in part on the first time, the second time, and the timing information, where the echo represents a reflection of the first pulse by the object (1204). The wireless communication device further transmits the feedback to the transmitting device (1205). The process 1200 may include additional aspects, such as any single aspect or any combination of aspects described below or in connection with one or more other aspects described elsewhere herein.

In a first aspect, the wireless communication device may determine a direction of the transmitting device; detect a radar alert frame transmitted by the transmitting device prior to the codeword sequence, where the radar alert frame includes an indication of an address of the transmitting device and an address of the wireless communication device; and tune a plurality of antennas of the wireless communication device in the direction of the transmitting device, responsive to detecting the radar alert frame, to detect the codeword sequence.

In a second aspect, alone or in combination with the first aspect, the wireless communication device may position a plurality of antennas of the wireless communication device in a plurality of directions to detect the echo of the first pulse.

In a third aspect, alone or in combination with one or more of the first and second aspects, the one or more pulses may include a sequence of pulses and the timing information may indicate a delay between the codeword sequence and the beginning of the sequence of pulses.

In a fourth aspect, alone or in combination with one or more of the first through third aspects, the wireless communication device may identify a position of the first pulse in the sequence of pulses based on the first time, the second time, and the timing information, where the feedback includes an indication of the position of the first pulse.

In a fifth aspect, alone or in combination with one or more of the first through fourth aspects, the wireless communication device may determine at least one of an azimuth or an elevation of an angle of arrival (AOA) of the echo, where the feedback includes an indication of the determined azimuth or elevation.

In a sixth aspect, alone or in combination with one or more of the first through fifth aspects, the wireless communication device may determine a delay between the transmission of the first pulse and the detection of the echo based on the first time, the second time, and the timing information, where the feedback includes an indication of the determined delay.

In a seventh aspect, alone or in combination with one or more of the first through sixth aspects, the wireless communication device may measure a channel impulse response (CIR) associated with the echo, where the feedback indicates the measured CIR and a delay between the transmission of the respective pulse and the measurement of the CIR.

In an eighth aspect, alone or in combination with one or more of the first through seventh aspects, the wireless communication device may determine a distance or Doppler shift associated with the object in relation to the wireless communication device based at least in part on the first echo, where the feedback includes the determined distance or Doppler shift.

Figure 12B:
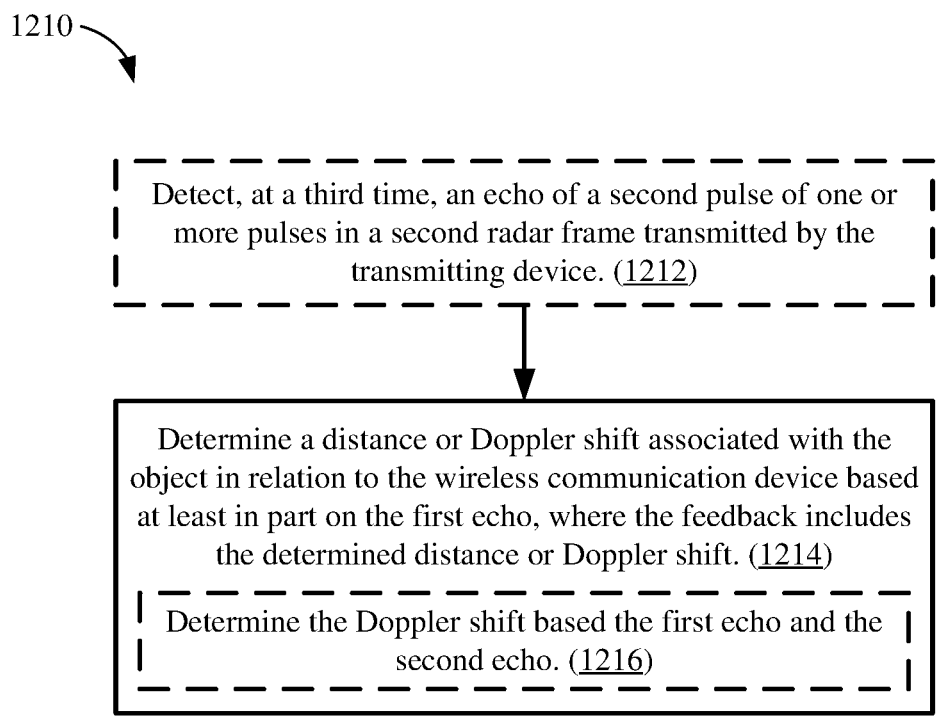
FIG. 12B shows an illustrative flowchart depicting an example wireless communication operation.

FIG. 12B shows an illustrative flowchart depicting an example wireless communication operation 1210. The example operation 1210 may be performed by a wireless communication device such as any of the radar receivers 420, RRX1, or RRX2 of FIGS. 4-10. In some implementations, the example operation 1210 may be performed after the wireless communication operation 1200 of FIG. 12A.

In some implementations, the wireless communication device may detect, at a third time, an echo of a second pulse of the one or more pulses in a second radar frame transmitted by the transmitting device (1212). The wireless communication device determines a distance or Doppler shift associated with the object in relation to the wireless communication device based at least in part on the first echo, where the feedback includes the determined distance or Doppler shift (1214). In some implementations, the wireless communication device may determine the Doppler shift based on the first echo and the second echo (1216).

Figure 13:
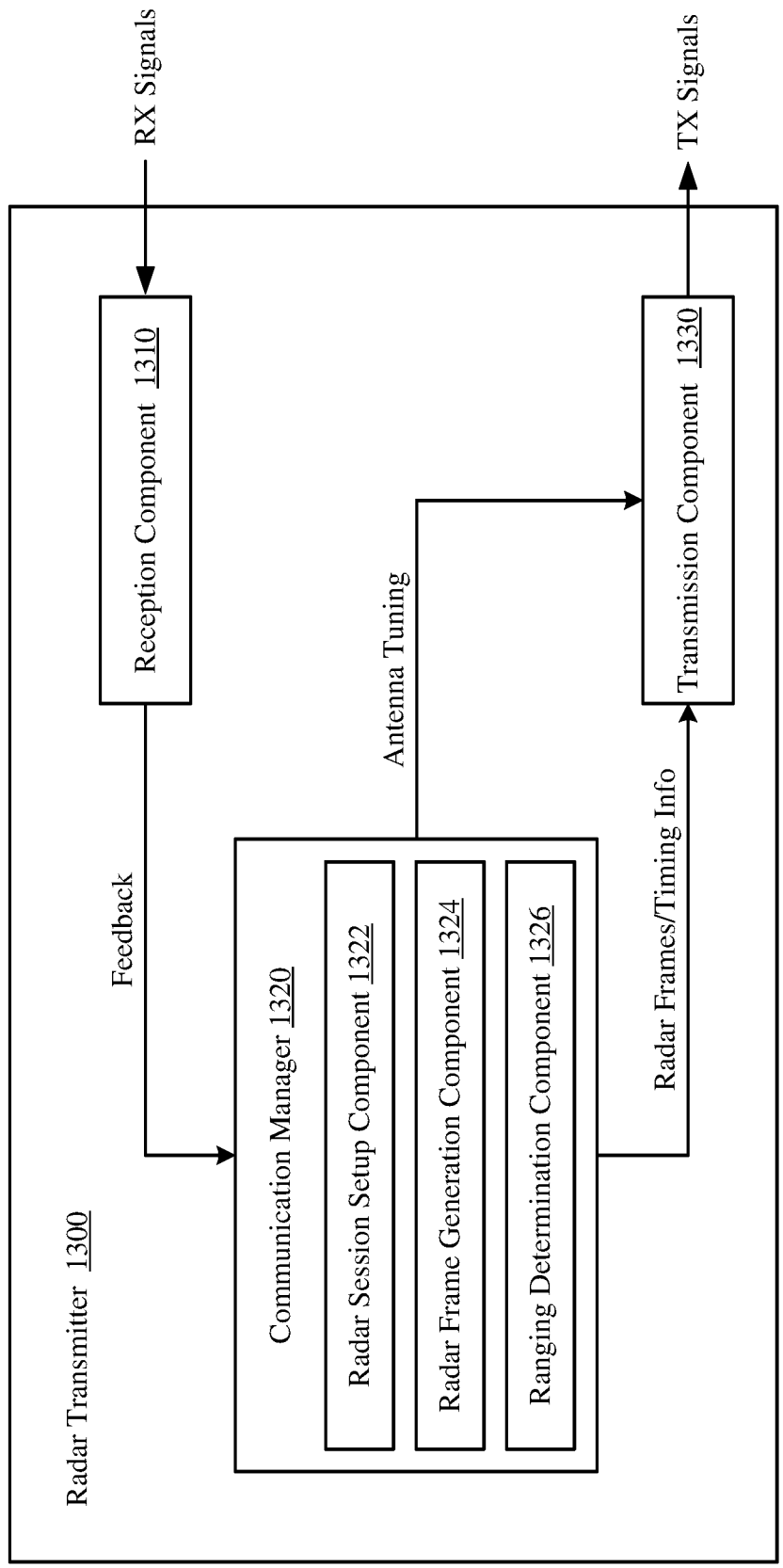
FIG. 13 shows a block diagram of an example radar transmitter.

FIG. 13 shows a block diagram of an example radar transmitter 1300. In some implementations, the radar transmitter 1300 may be configured to perform any of the processes 1100 or 1110 described above with reference to FIGS. 11A and 11B, respectively. The radar transmitter 1300 can be an example implementation of the AP 300 of FIG. 3. For example, the radar transmitter 1300 can be a chip, SoC, chipset, package or device that includes at least one processor and at least one modem (for example, a Wi-Fi (IEEE 802.11) modem or a cellular modem).

The radar transmitter 1300 includes a reception component 1310, a communication manager 1320, and a transmission component 1330. The communication manager 1320 further includes a radar session setup component 1322, a radar frame generation component 1324, and a ranging determination component 1326. Portions of one or more of the components 1322-1326 may be implemented at least in part in hardware or firmware. In some implementations, at least some of the components 1322, 1324, or 1326 are implemented at least in part as software stored in a memory (such as the memory 330). For example, portions of one or more of the components 1322, 1324, and 1326 can be implemented as non-transitory instructions (or "code") executable by a processor (such as the processor 320) to perform the functions or operations of the respective component.

The reception component 1310 is configured to receive RX signals from one or more radar receivers. In some implementations, the RX signals may include feedback from one or more receiving devices. The communication manager 1320 is configured to manage radar communications with the one or more receiving devices. In some implementations, the radar session setup component 1322 may obtain a distance and direction of the one or more receiving devices; the radar frame generation component 1324 may generate a radar frame including a codeword sequence and one or more pulses, where the feedback represents a relationship between a first pulse of the one or more pulses and an echo of the first pulse detected by at least one of the receiving devices; and the ranging determination component 1326 may determine ranging information about an object along a path of the first pulse based, at least in part, on the received feedback and the distance or direction of the at least one receiving device, where the echo represents a reflection of the first pulse by the object. The transmission component 1330 is configured to transmit the radar frames as one or more TX signals. In some implementations, the communication manager 1320 may tune an antenna array of the transmission component 1330 to transmit one or more portions of the radar frame in different directions using beamforming. In some implementations, the TX signals may include timing information indicating a timing relationship between the codeword sequence and the one or more pulses of the radar frame.

Figure 14:
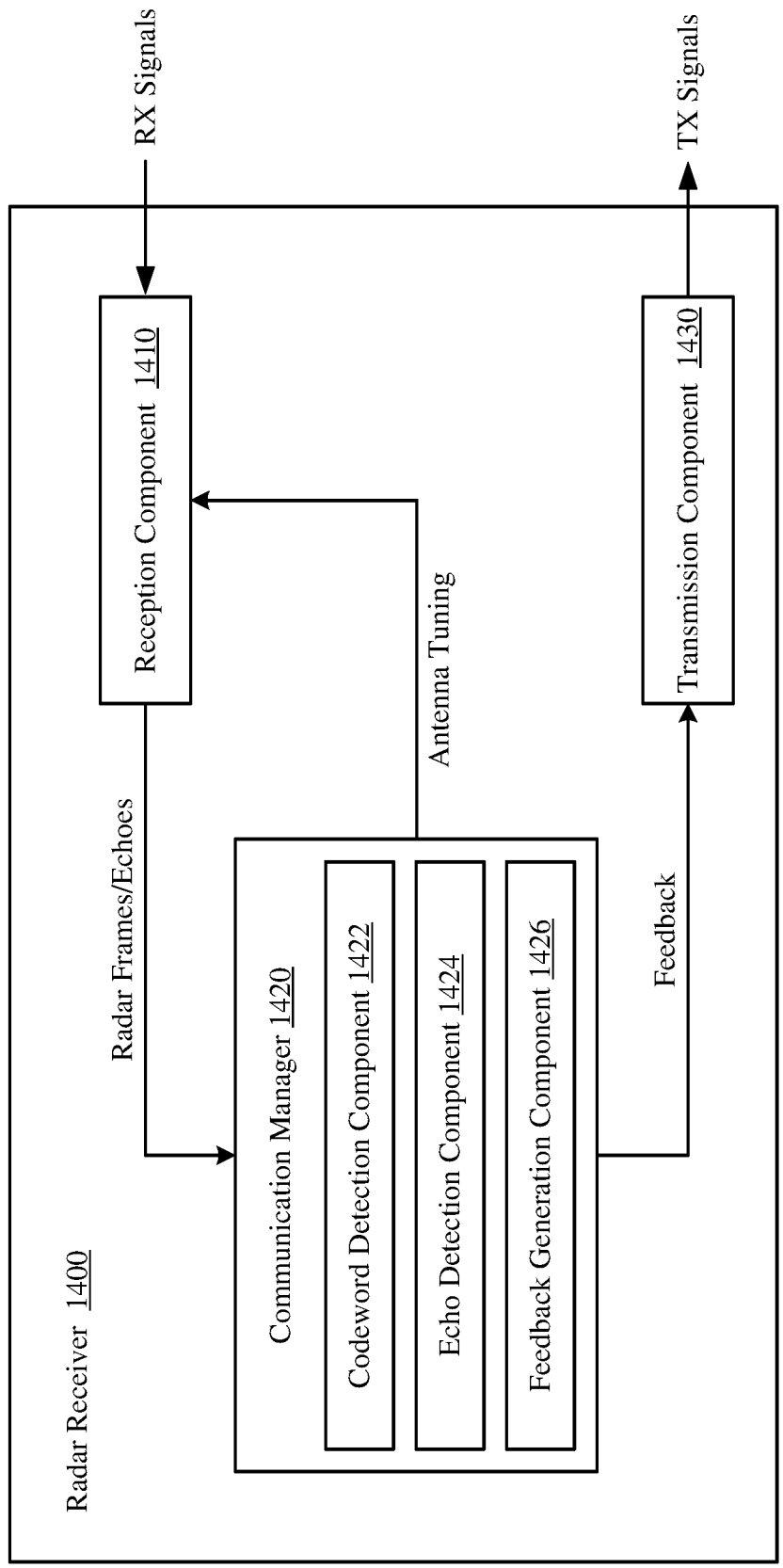
FIG. 14 shows a block diagram of an example radar receiver.

FIG. 14 shows a block diagram of an example radar receiver 1400. In some implementations, the radar receiver 1400 may be configured to perform any of the processes 1200 or 1210 described above with reference to FIGS. 12A and 12B, respectively. The radar receiver 1400 can be an example implementation of the STA 200 of FIG. 2. For example, the radar receiver 1400 can be a chip, SoC, chipset, package or device that includes at least one processor and at least one modem (for example, a Wi-Fi (IEEE 802.11) modem or a cellular modem).

The radar receiver 1400 includes a reception component 1410, a communication manager 1420, and a transmission component 1430. The communication manager 1420 further includes a codeword detection component 1422, an echo detection component 1424, and a feedback generation component 1426. Portions of one or more of the components 1422-1426 may be implemented at least in part in hardware or firmware. In some implementations, at least some of the components 1422, 1424, or 1426 are implemented at least in part as software stored in a memory (such as the memory 240). For example, portions of one or more of the components 1422, 1424, and 1426 can be implemented as non-transitory instructions (or "code") executable by a processor (such as the processor 220) to perform the functions or operations of the respective component.

The reception component 1410 is configured to receive RX signals from a radar transmitter. In some implementations, the RX signals may include echoes or portions of a radar frame transmitted by a transmitting device, where the radar frame includes a codeword sequence and one or more pulses. The communication manager 1420 is configured to manage radar communications with the transmitting device. In some implementations, the communication manager 1420 may tune an antenna array of the transmission component 1430 in different directions to receive the echoes or portions of the radar frame using beamforming. In some implementations, the codeword detection component 1422 may detect a first codeword of the codeword sequence in the radar frame; the echo detection component 1424 may detect an echo of a first pulse of the one or more pulses of the radar frame; and the feedback generation component 1426 may generate feedback about an object along a path of the first pulse based at least in part on the timing information and the times at which the first codeword and the echo are detected, where the echo represents a reflection of the first pulse by the object. The transmission component 1430 is configured to transmit the feedback, as one or more TX signals, to the transmitting device.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication performed by a wireless communication device, comprising:
    transmitting, to one or more receiving devices, timing information indicating a timing relationship between a codeword sequence and one or more pulses;
    transmitting a respective codeword of the codeword sequence, using beamforming, in a direction of each of the one or more receiving devices;
    transmitting the one or more pulses, using beamforming, in a plurality of directions, the one or more pulses being transmitted in a first radar frame; and
    receiving, from at least one of the one or more receiving devices, feedback associated with at least one object along a path of a first pulse of the one or more pulses transmitted in the first radar frame, the feedback indicating a relationship between the first pulse and an echo of the first pulse received by the at least one receiving device, the echo representing a reflection of the first pulse by the at least one object.

2. The method of claim 1, wherein the feedback indicates a channel impulse response (CIR) associated with the echo and a delay between the transmission of the first pulse and a measuring of the CIR by the at least one receiving device.

3. The method of claim 2, further comprising:
    determining a velocity of the at least one object associated with the CIR and the delay between the transmission of the first pulse and the measuring of the CIR by the at least one receiving device.

4. The method of claim 1, further comprising:
    exchanging, with the one or more receiving devices, one or more frames associated with a session setup operation, the one or more frames indicating a distance and direction of each of the one or more receiving devices; and
    determining at least one of a distance, direction, or velocity of the at least one object associated with the received feedback and the distance or direction of the at least one receiving device from which the feedback is received.

5. The method of claim 4, further comprising:
    transmitting, to the one or more receiving devices, one or more radar alert frames preceding the codeword sequence, each of the one or more radar alert frames being transmitted in the direction of a respective one of the receiving devices and indicating an address of the respective receiving device and an address to which the feedback is to be sent.

6. The method of claim 1, wherein the transmitting of the one or more pulses comprises:
    changing an antenna configuration of the wireless communication device to transmit the one or more pulses in the plurality of directions, each of the antenna configurations being associated with a respective one of the plurality of directions.

7. The method of claim 1, wherein the feedback indicates at least one of an azimuth or an elevation associated with an angle of arrival (AOA) of the echo in relation to the at least one receiving device.

8. The method of claim 1, wherein the feedback indicates a delay between the transmission of the first pulse and the reception of the echo by the at least one receiving device.

9. The method of claim 1, wherein the feedback indicates a distance or Doppler shift measured by the at least one receiving device in relation to the at least one object.

10. The method of claim 1, further comprising:
    retransmitting the one or more pulses, using beamforming, in the plurality of directions, the one or more pulses being retransmitted in a second radar frame;
    receiving, from the at least one receiving device, additional feedback associated with the one or more pulses retransmitted in the second radar frame; and
    determining a velocity of the at least one object associated with the feedback received responsive to the first radar frame and the additional feedback received responsive to the second radar frame.

11. A wireless communication device comprising:
one or more processors; and
a memory storing instructions that, when executed by the one or more processors, cause the wireless communication device to:
   transmit, to one or more receiving devices, timing information indicating a timing relationship between a codeword sequence and one or more pulses;
   transmit a respective codeword of the codeword sequence, using beamforming, in a direction of each of the one or more receiving devices;
   transmit the one or more pulses, using beamforming, in a plurality of directions, the one or more pulses being transmitted in a first radar frame; and
   receive, from at least one of the one or more receiving devices, feedback associated with at least one object along a path of a first pulse of the one or more pulses transmitted in the first radar frame, the feedback indicating a relationship between the first pulse and an echo of the first pulse received by the at least one receiving device, the echo representing a reflection of the first pulse by the at least one object.

12. The wireless communication device of claim 11, wherein the feedback indicates a channel impulse response (CIR) associated with the echo and a delay between the transmission of the first pulse and a measuring of the CIR by the at least one receiving device, execution of the instructions further causing the wireless communication device to:
   determine a velocity of the at least one object associated with the CIR and the delay between the transmission of the first pulse and the measuring of the CIR by the at least one receiving device.

13. The wireless communication device of claim 11, wherein execution of the instructions further causes the wireless communication device to:
   exchange, with the one or more receiving devices, one or more frames associated with a session setup operation, the one or more frames indicating a distance and direction of each of the one or more receiving devices; and
   determine at least one of a distance, direction, or velocity of the at least one object associated with the received feedback and the distance or direction of the at least one receiving device from which the feedback is received.

14. The wireless communication device of claim 11, wherein execution of the instructions further causes the wireless communication device to:
   transmit, to the one or more receiving devices, one or more radar alert frames preceding the codeword sequence, each of the one or more radar alert frames being transmitted in the direction of a respective one of the receiving devices and indicating an address of the respective receiving device and an address to which the feedback is to be sent.

15. The wireless communication device of claim 11, wherein execution of the instructions further causes the wireless communication device to:
   retransmit the one or more pulses, using beamforming, in the plurality of directions, the one or more pulses being retransmitted in a second radar frame;
   receive, from the at least one receiving device, additional feedback associated with the one or more pulses retransmitted in the second radar frame; and
   determine a velocity of the at least one object associated with the feedback received responsive to the first radar frame and the additional feedback received responsive to the second radar frame.

16. A method of wireless communication performed by a wireless communication device, comprising:
   receiving, from a transmitting device, timing information indicating a timing relationship between a codeword sequence and one or more pulses;
   receiving, at a first time, a first codeword of the codeword sequence in a first radar frame transmitted by the transmitting device;
   receiving, at a second time, an echo of a first pulse of the one or more pulses in the first radar frame, the echo representing a reflection of the first pulse by an object; and
   determining a distance of the object associated with the first time, the second time, and the timing information.

17. The method of claim 16, further comprising:
   exchanging, with the transmitting device, one or more frames associated with a session setup operation, the one or more frames indicating a distance and direction of the transmitting device, the determined distance of the object being further associated with the distance and direction of the transmitting device.

18. The method of claim 17, further comprising:
   receiving a radar alert frame transmitted by the transmitting device prior to the codeword sequence, the radar alert frame including an indication of an address of the transmitting device and an address of the wireless communication device; and
   tuning a plurality of antennas of the wireless communication device in the direction of the transmitting device, responsive to receiving the radar alert frame, to receive the codeword sequence.

19. The method of claim 18, further comprising:
   transmitting, to the transmitting device, feedback associated with the radar alert frame.

20. The method of claim 16, further comprising:
   positioning a plurality of antennas of the wireless communication device in a plurality of directions to receive the echo of the first pulse.

21. The method of claim 16, wherein the one or more pulses comprises a sequence of pulses and the timing information indicates a delay between the codeword sequence and the beginning of the sequence of pulses.

22. The method of claim 16, further comprising:
   determining at least one of an azimuth or an elevation associated with an angle of arrival (AOA) of the echo.

23. The method of claim 16, wherein the determined distance of the object is further associated with a delay between the transmission of the first pulse and the reception of the echo.

24. The method of claim 16, wherein the second time represents a time at which a channel impulse response (CIR) exceeds a threshold energy level.

25. The method of claim 16, further comprising:
   receiving, at a third time, an echo of a second pulse of one or more pulses in a second radar frame transmitted by the transmitting device; and
   determining a Doppler shift associated with the echo of the first pulse and the echo of the second pulse, the Doppler shift indicating a velocity of the object.

26. A wireless communication device comprising:
one or more processors; and
memory storing instructions that, when executed by the one or more processors, cause the wireless communication device to:
   receive, from a transmitting device, timing information indicating a timing relationship between a codeword sequence and one or more pulses;

receive, at a first time, a first codeword of the codeword sequence in a first radar frame transmitted by the transmitting device;

receive, at a second time, an echo of a first pulse of the one or more pulses in the first radar frame, the echo representing a reflection of the first pulse by an object; and determine a distance of an object associated with the first time, the second time, and the timing information.

27. The wireless communication device of claim 26, wherein execution of the instructions further causes the wireless communication device to:

exchange, with the transmitting device, one or more frames associated with a session setup operation, the one or more frames indicating a distance and direction of the transmitting device, the determined distance of the object being further associated with the distance and direction of the transmitting device.

28. The wireless communication device of claim 27, wherein execution of the instructions further causes the wireless communication device to:

receive a radar alert frame transmitted by the transmitting device prior to the codeword sequence, the radar alert frame including an indication of an address of the transmitting device and an address of the wireless communication device; and tune a plurality of antennas of the wireless communication device in the direction of the transmitting device, responsive to receiving the radar alert frame, to receive the codeword sequence.

29. The wireless communication device of claim 26, wherein the second time represents a time at which a channel impulse response (CIR) exceeds a threshold energy level.

30. The wireless communication device of claim 26, wherein execution of the instructions further causes the wireless communication device to:

receive, at a third time, an echo of a second pulse of one or more pulses in a second radar frame transmitted by the transmitting device; and determine a Doppler shift associated with the echo of the first pulse and the echo of the second pulse, the Doppler shift indicating a velocity of the object.

* * * * *